US012228883B2

(12) United States Patent
Ishizuka et al.

(10) Patent No.: US 12,228,883 B2
(45) Date of Patent: Feb. 18, 2025

(54) TONER FOR DEVELOPING ELECTROSTATIC CHARGE IMAGE AND ELECTROSTATIC CHARGE IMAGE DEVELOPER

(71) Applicant: FUJIFILM Business Innovation Corp., Tokyo (JP)

(72) Inventors: Daisuke Ishizuka, Kanagawa (JP); Shinya Sakamoto, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 665 days.

(21) Appl. No.: 17/493,267

(22) Filed: Oct. 4, 2021

(65) Prior Publication Data

US 2022/0390868 A1 Dec. 8, 2022

(30) Foreign Application Priority Data

May 25, 2021 (JP) ................................ 2021-087873

(51) Int. Cl.
*G03G 9/08* (2006.01)
*G03G 9/087* (2006.01)
(Continued)

(52) U.S. Cl.
CPC ....... *G03G 9/08755* (2013.01); *G03G 9/0821* (2013.01); *G03G 9/091* (2013.01); *G03G 15/08* (2013.01)

(58) Field of Classification Search
None
See application file for complete search history.

(56) References Cited

U.S. PATENT DOCUMENTS

| | | | |
|---|---|---|---|
| 10,012,920 | B2 | 7/2018 | Shibata et al. |
| 2011/0281214 | A1 | 11/2011 | Kuroyama |

(Continued)

FOREIGN PATENT DOCUMENTS

| | | | |
|---|---|---|---|
| JP | 2007-086502 | A | 4/2007 |
| JP | 2010-079008 | A | 4/2010 |

(Continued)

OTHER PUBLICATIONS

Extended European Search Report issued May 16, 2022 in European Application No. 21205896.0.

(Continued)

*Primary Examiner* — Peter L Vajda
*Assistant Examiner* — Charles Collins Sullivan, IV
(74) *Attorney, Agent, or Firm* — Sughrue Mion, PLLC

(57) ABSTRACT

A toner for developing an electrostatic charge image contains toner particles containing an amorphous resin and a crystalline resin. The ratio Qs1/Qf1 is 1.1 or more and 2.0 or less, where Qf1 is the total area of all endothermic peaks detected during the first temperature rise when the toner particles are analyzed by differential scanning calorimetry after one-day storage under 50° C. conditions, and Qs1 is the total area of all endothermic peaks detected during the first temperature rise when classified toner particles are analyzed by differential scanning calorimetry after one-day storage under 50° C. conditions. The classified toner particles are a fraction of the toner particles in which toner particles having a diameter equal to or larger than the volume-average diameter D50v of the toner particles constitute 10% by number or less.

18 Claims, 2 Drawing Sheets

(51) Int. Cl.
*G03G 9/09* (2006.01)
*G03G 15/08* (2006.01)

(56) References Cited

U.S. PATENT DOCUMENTS

| | | | |
|---|---|---|---|
| 2014/0370426 | A1 | 12/2014 | Ishizuka et al. |
| 2017/0102630 | A1 | 4/2017 | Moriya |
| 2018/0059561 | A1 | 3/2018 | Nakashima et al. |

FOREIGN PATENT DOCUMENTS

| | | | |
|---|---|---|---|
| JP | 2012-63496 | A | 3/2012 |
| JP | 2013-222052 | A | 10/2013 |
| JP | 2014-115508 | A | 6/2014 |
| JP | 2016-110140 | A | 6/2016 |
| JP | 2017-003990 | A | 1/2017 |
| JP | 2020-160419 | A | 10/2020 |

OTHER PUBLICATIONS

Notice of Reasons for Refusal issued Sep. 24, 2024 in Japanese Patent Application No. 2021-087873.

TONER FOR DEVELOPING ELECTROSTATIC CHARGE IMAGE AND ELECTROSTATIC CHARGE IMAGE DEVELOPER

CROSS-REFERENCE TO RELATED APPLICATIONS

This application is based on and claims priority under 35 USC 119 from Japanese Patent Application No. 2021-087873 filed May 25, 2021.

BACKGROUND

(i) Technical Field

The present disclosure relates to toner for developing an electrostatic charge image and an electrostatic charge image developer.

(ii) Related Art

Electrophotography and other techniques for visualizing image information are used in various fields today. In electrophotographic visualization of image information, the surface of an image carrier is charged, and an electrostatic charge image, which is the image information, is created thereon. Then a developer, which contains toner, is applied to form a toner image on the surface of the image carrier. This toner image is transferred to a recording medium and fixed on the recording medium.

For example, Japanese Unexamined Patent Application Publication No. 2010-79008 discloses "a method for manufacturing an electrophotographic toner comprising a step of kneading a mixture, containing a binder resin, a colorant, and an UV absorbent containing titanium oxide fine particles, having a particle diameter of 100 nm by 5 to 30 wt. % with respect to a total amount of the binder resin, the colorant and the UV absorbent, in an open roll type kneading machine; and a step of pulverizing and classifying the kneaded material."

Japanese Unexamined Patent Application Publication No. 2014-115508 discloses "a manufacturing method of a decolorable electrophotographic toner comprising kneading while heating a UV absorber, a colorant, a master batch including a first resin, and a decoloring agent."

Japanese Unexamined Patent Application Publication No. 2017-3990 discloses "a toner comprising a toner particle containing an amorphous polyester resin, a crystalline polyester resin and a wax, wherein in a cross-section of the toner by transmission electron microscopy (TEM), domains of the wax and crystals of the crystalline polyester resin are present, the area occupied by the domains of the wax is from 0.5% to 8.0% and the area occupied by the crystals of the crystalline polyester resin is from 0.5% to 8.0% of the cross-sectional area of the toner, the number-average diameter (Dw) of the domains of the wax is from 60 nm to 240 nm, the aspect ratio of the crystals of the crystalline polyester resin is from 5.0 to 25.0, and the number-average diameter (Dc) of major axis lengths of the crystals of the crystalline polyester resin is from 0.8 to 2.0 times the number-average diameter (Dw) of the domains of the wax."

Japanese Unexamined Patent Application Publication No. 2016-110140 discloses "a toner comprising a toner particle comprising a crystalline resin and an amorphous resin, wherein the toner satisfies a predetermined relationship in terms of heat of fusion originating with the crystalline resin during first and second temperature ramp ups in measurement on the toner using a differential scanning calorimeter (DSC), the toner particle has a matrix-domain structure in which domains of the crystalline resin are present in a matrix of the amorphous resin, at least 90 number % of the crystalline resin domains are domains with a diameter from 0.05 μm to 0.50 μm, and SF1 for the crystalline resin domains is from 100 to 130."

Japanese Unexamined Patent Application Publication No. 2013-222052 discloses "a toner for electrostatic charge development produced by melting and kneading a toner composition containing at least a binder resin, a colorant, a charge control agent and wax, then pulverizing and classifying, wherein the binder resin comprises an amorphous polyester resin and a crystalline polyester resin, the crystalline polyester resin has a melting point in a range from 85 to 120° C. and is included by 5 to 30 wt. % with respect to 100 pts. wt. of the binder resin, the colorant comprises carbon black having a DBP absorption amount of 80 $cm^3$/100 g or less, the charge control agent comprises an azo-based iron complex compound, and the toner has a volume median particle diameter (D50) of 5.5 to 7.5 μm, in which a content percentage of toner base particles having a particle diameter of 5 μm or less is from 15 to 55% on a number basis."

SUMMARY

Aspects of non-limiting embodiments of the present disclosure relate to a toner for developing an electrostatic charge image, the toner containing toner particles containing amorphous and crystalline resins. With this toner, compared with ones for which the ratio Qs1/Qf1, defined below, is less than 1.1 or more than 2.0, the resulting image may be highly weatherable.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a toner for developing an electrostatic charge image, the toner containing toner particles containing an amorphous resin and a crystalline resin. A ratio Qs1/Qf1 is 1.1 or more and 2.0 or less, where Qf1 is a total area of all endothermic peaks detected during a first temperature rise when the toner particles are analyzed by differential scanning calorimetry after one-day storage under 50° C. conditions, and Qs1 is a total area of all endothermic peaks detected during a first temperature rise when classified toner particles are analyzed by differential scanning calorimetry after one-day storage under 50° C. conditions, the classified toner particles being a fraction of the toner particles in which toner particles having a diameter equal to or larger than a volume-average diameter D50v of the toner particles constitute 10% by number or less.

BRIEF DESCRIPTION OF THE DRAWINGS

Exemplary embodiments of the present disclosure will be described in detail based on the following figures, wherein.

DETAILED DESCRIPTION

Figure 1:
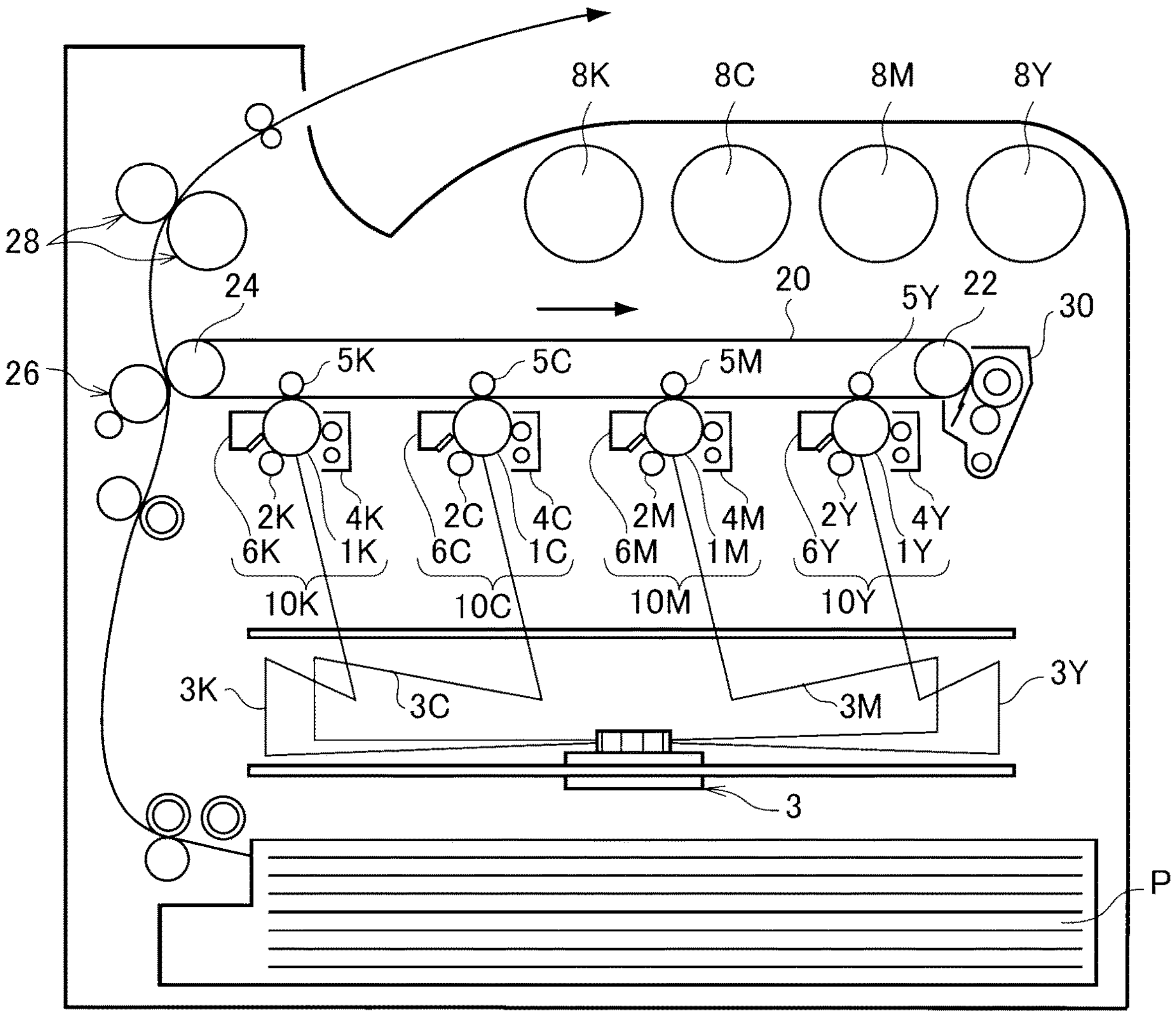
FIG. 1 is a schematic view of the structure of an example of an image forming apparatus according to an exemplary embodiment.

The following describes exemplary embodiments of the present disclosure. The following description and Examples are merely examples of the disclosure and do not limit the scope of the disclosure.

Numerical ranges specified with "A-B," "between A and B," "(from) A to B," etc., herein represent inclusive ranges, which include the minimum A and the maximum B as well as all values in between.

The following description also includes series of numerical ranges. In such a series, the upper or lower limit of a numerical range may be substituted with that of another in the same series. The upper or lower limit of a numerical range, furthermore, may be substituted with a value indicated in the Examples section.

A gerund or action noun used in relation to a certain process or method herein does not always represent an independent action. As long as its purpose is fulfilled, the action represented by the gerund or action noun may be continuous with or part of another.

A description of an exemplary embodiment herein may make reference to drawing(s). The reference, however, does not mean that what is illustrated is the only possible configuration of the exemplary embodiment. The size of elements in each drawing is conceptual; the relative sizes of the elements do not need to be as illustrated.

An ingredient herein may be a combination of multiple substances. If a composition described herein contains a combination of multiple substances as one of its ingredients, the amount of the ingredient represents the total amount of the substances in the composition unless stated otherwise.

An ingredient herein, furthermore, may be a combination of multiple kinds of particles. If a composition described herein contains a combination of multiple kinds of particles as one of its ingredients, the diameter of particles of the ingredient is that of the mixture of the multiple kinds of particles present in the composition.

"Toner for developing an electrostatic charge image" herein may be referred to simply as "toner." "An electrostatic charge image developer" herein may be referred to simply as "a developer."

Toner for Developing an Electrostatic Charge Image

First Exemplary Embodiment

Toner according to a first exemplary embodiment contains toner particles containing an amorphous resin and a crystalline resin.

For the toner according to the first exemplary embodiment, the ratio Qs1/Qf1 is 1.1 or more and 2.0 or less. Qf1 is the total area of all endothermic peaks detected during the first temperature rise when the toner particles are analyzed by differential scanning calorimetry after one-day storage under 50° C. conditions, and Qs1 is the total area of all endothermic peaks detected during the first temperature rise when classified toner particles are analyzed by differential scanning calorimetry after one-day storage under 50° C. conditions, the classified toner particles being a fraction of the toner particles in which toner particles having a diameter equal to or larger than the volume-average diameter D50v of the toner particles constitute 10% by number or less.

Configured as such, the toner according to the first exemplary embodiment may give highly weatherable images. A possible reason is as follows.

Images produced with known toners have varying degrees of weatherability depending on the photodegradability of the coloring agent(s) contained in the toner particles. With toners made with binder resins transparent to visible light, therefore, the colors of the image inevitably fade over time as a result of photodegradation. Worse yet, a history of damage, for example by bending, accelerates the photodegradation of the image because it makes the coloring agent(s) exposed.

To address this, the industry has used the technique of adding an ultraviolet absorber or quencher material to the toner. Such an additive, however, imparts only short-lived weather resistance.

The toner according to this exemplary embodiment is configured such that the ratio Qs1/Qf1, where Qf1 and Qs1 are the total areas of all endothermic peaks detected during the first temperature rise when the full-range and classified toner particles, respectively, are analyzed by differential scanning calorimetry after one-day storage under 50° C. conditions, is 1.1 or more and 2.0 or less.

That is, the total area Qs1 of all endothermic peaks from the classified toner particles is larger than the total area Qf1 of all endothermic peaks from the full-range toner particles. This means the crystalline resin, a component the presence of which results in an endothermic peak, is more abundant in the classified toner particles than in the full-range toner particles.

In the classified toner particles, furthermore, toner particles having a diameter equal to or larger than the volume-average diameter D50v of the full-range toner particles constitute 10% by number or less. This means in the classified toner particles, smaller particles are in the majority.

Overall, the classified toner particles, in which smaller particles are in the majority, are rich in crystalline resin compared with the full-range toner particles.

When an image is formed with a toner having such a distribution of crystalline resin percentages, crystalline-rich, small-diameter toner particles tend to come close to the surface of the resulting toner image compared with crystalline-scarce, large-diameter toner particles.

When the toner image is fixed to complete the image, furthermore, the crystalline-rich, small-diameter toner particles form relatively large crystalline-resin domains early in the period of fixation.

The relatively large crystalline-resin domains formed near the surface of the image will reduce the penetration of visible light into the image as they scatter any incoming light with their crystal structure.

During the fixation, furthermore, the crystalline resin, which is of low viscosity, tends to become exposed on the surface of the image as a result of microdispersion. The crystalline resin exposed on the surface of the image will also reduce the penetration of visible light into the image by scattering incoming light with its crystal structure.

In addition, even if the image has a history of deformation, for example by bending, the damage to the image is limited by virtue of high flexibility of the crystalline resin.

As a result, the image will suffer only limited photodegradation of the coloring agent(s) therein.

Presumably for these reasons, the toner according to the first exemplary embodiment, configured as described above, may give highly weatherable images.

Second Exemplary Embodiment

Toner according to a second exemplary embodiment contains toner particles containing an amorphous resin and a crystalline resin.

For the toner according to the second exemplary embodiment, the ratio Ws/Wf is 1.05 or more and 1.20 or less. Wf is the crystalline resin content of the toner particles, and Ws is the crystalline resin content of classified toner particles, a fraction of the toner particles in which toner particles having a diameter equal to or larger than the volume-average diameter D50v of the toner particles constitute 10% by number or less.

Configured as such, the toner according to the second exemplary embodiment may give highly weatherable images.

Like that according to the first exemplary embodiment, the toner according to the second exemplary embodiment is configured such that the classified toner particles described above, in which smaller particles are in the majority, are rich in crystalline resin compared with the full-range toner particles.

By virtue of this, the inventors believe, the toner according to the second exemplary embodiment may give highly weatherable images for the same reasons as that according to the first exemplary embodiment.

The following describes a toner that is one according to the first exemplary embodiment while being one according to the second exemplary embodiment (hereinafter also referred to as "toner according to this exemplary embodiment") in detail. Any toner that is one according to at least one of the first or second exemplary embodiment, however, is an example of a toner according to an exemplary embodiment of the present disclosure.

The toner according to this exemplary embodiment contains toner particles. The toner may contain external additives, i.e., additives present in the toner but outside the toner particles.

Toner Particles

Endothermic Peak Characteristics by Differential Scanning Calorimetry

The ratio Qs1/Qf1, where Qf1 and Qs1 are the total areas of all endothermic peaks detected during the first temperature rise when the full-range and classified toner particles, respectively, are analyzed by differential scanning calorimetry after one-day storage under 50° C. conditions, is 1.1 or more and 2.0 or less. Qs1/Qf1 may be 1.35 or more and 1.85 or less; this may help further improve the weatherability of the image. Preferably, Qs1/Qf1 is 1.50 or more and 1.75 or less.

The ratio Qf2/Qf1, where Qf1 and Qf2 are the total areas of all endothermic peaks detected during the first and second temperature rises, respectively, when the full-range toner particles are analyzed by differential scanning calorimetry after one-day storage under 50° C. conditions, may be 0.1 or more and 0.8 or less. Preferably, Qf2/Qf1 is 0.40 or more and 0.75 or less, more preferably 0.50 or more and 0.65 or less.

A ratio Qf2/Qf1 in any of these ranges may help further improve the weatherability of the image.

The difference (Qf2/Qf1−Qs2/Qs1) between the ratio Qf2/Qf1 and a ratio Qs2/Qs1, where Qs1 and Qs2 are the total areas of all endothermic peaks detected during the first and second temperature rises, respectively, when the classified toner particles are analyzed by differential scanning calorimetry after one-day storage under 50° C. conditions, may be 0.01 or more and 0.5 or less. Preferably, (Qf2/Qf1−Qs2/Qs1) is 0.10 or more and 0.40 or less, more preferably 0.20 or more and 0.35 or less.

A difference (Qf2/Qf1−Qs2/Qs1) in any of these ranges may help further improve the weatherability of the image.

The total areas of endothermic peaks by differential scanning calorimetry are measured as follows.

First, the toner particles of interest are stored at 50° C. for one day.

Then the stored toner particles are analyzed by differential scanning calorimetry (DSC) in accordance with ASTM D3418-8 (2008). Specifically, measurement is performed as follows.

First, on a differential scanning calorimeter equipped with an automated tangent processing system (Shimadzu DSC-60 Plus), 10 mg of the toner particles of interest is heated from room temperature (25° C.) to 200° C. at a rate of 10° C./min and held at 200° C. for 5 minutes. This will give a thermal spectrum (DSC curve) for the first temperature rise.

Following this, the toner particles are cooled to 50° C. at a rate of −10° C./min using liquid nitrogen and held at 50° C. for 2 hours.

Then the toner particles are heated from 50° C. to 200° C. at a rate of 10° C./min. This will give a thermal spectrum (DSC curve) for the second temperature rise.

The thermal spectra (DSC curves) for the first and second temperature rises are examined to locate the detected endothermic peaks. An endothermic peak in this context represents a peak having a full width at half maximum (half width) of 15° C. or narrower.

From calculated areas of the individual endothermic peaks, the total areas of endothermic peaks Qf1, Qf2, Qs1, and Qs2 are determined.

Instead of isolated toner particles, the total areas of endothermic peaks by differential scanning calorimetry may be measured on toner containing the toner particles of interest and external additives or a classified fraction of the toner.

Crystalline Resin Content of the Classified Toner Particles

The ratio Ws/Wf, where Wf is the crystalline resin content of the full-range toner particles, and Ws is the crystalline resin content of classified toner particles, a fraction of the toner particles in which toner particles having a diameter equal to or larger than the volume-average diameter D50v of the toner particles constitute 10% by number or less, is 1.05 or more and 1.20 or less. Ws/Wf may be 1.05 or more and 1.15 or less; this may help further improve the weatherability of the image. Preferably, Ws/Wf is 1.10 or more and 1.13 or less.

The crystalline resin content of the classified toner particles may be 4.0% by mass or more and 50.0% by mass or less. Preferably, this crystalline resin content is 4.5% by mass or more and 50.0% by mass or less, more preferably 8.0% by mass or more and 20.0% by mass or less, in particular 10.0% by mass or more and 15.0% by mass or less. The crystalline resin content in this context is a percentage based on the mass of toner particles.

A crystalline resin content of the classified toner particles in any of these ranges may help further improve the weatherability of the image. In that case, the crystal structure of the crystalline resin will scatter incoming light and reduce the penetration of visible light into the image more effectively, and, as a result, the image will suffer only limited degradation of the coloring agent(s) therein.

Relative Areas of Crystalline-Resin Domains

In a cross-sectional observation of the full-range and classified toner particles, Ss may be larger than Sf, where Ss is the relative area Ss of crystalline-resin domains to the particle cross-sectional area in the classified toner particles, and Sf is that in the full-range toner particles.

Specifically, the relative areas Sf and Ss of crystalline-resin domains to the particle cross-sectional area in the full-range and classified toner particles, respectively, may be such that $1.10 \leq Ss/Sf \leq 1.30$. Preferably, $1.12 \leq Ss/Sf \leq 1.25$, more preferably $1.13 \leq Ss/Sf \leq 1.20$.

Making the relative area of crystalline-resin domains in the classified toner particles, which have smaller diameters, larger than that in the full-range toner particles may help further improve the weatherability of the image. In that case, the crystal structure of the crystalline resin will scatter incoming light and reduce the penetration of visible light into the image more effectively, and, as a result, the image will suffer only limited degradation of the coloring agent(s) therein.

The relative area Ss of crystalline-resin domains to the particle cross-sectional area in the classified toner particles may be 4.0% or more and 50.0% or less. An Ss in this range may help further improve the weatherability of the image. In that case, the crystal structure of the crystalline resin will scatter incoming light and reduce the penetration of visible light into the image more effectively, and, as a result, the image will suffer only limited degradation of the coloring agent(s) therein. Preferably, Ss is 4.0% or more and 45.0% or less, more preferably 8.0% or more and 20.0% or less, in particular 10.0% or more and 15.0% or less.

The relative areas of crystalline-resin domains are measured as follows.

A portion of the toner particles of interest is mixed into epoxy resin, and the epoxy resin is cured. The resulting solid is sliced using an ultramicrotome (Leica Ultracut UCT) to give a thin specimen having a thickness of 80 nm or more and 130 nm or less. The specimen is stained with ruthenium tetroxide for 3 hours in a desiccator at 30° C. A STEM image (acceleration voltage, 30 kV; magnification, 20000) of the stained specimen is obtained through transmission imaging using an ultrahigh-resolution field-emission scanning electron microscope (FE-SEM; Hitachi High-Technologies S-4800).

For each toner particle, the domains therein are examined to determine, from contrast and shape, whether each of them is a domain of crystalline resin or not. In the SEM image, binder resins, rich in double bonds, appear stained darker with ruthenium tetroxide than any other material (e.g., a release agent, if used; described later herein), and amorphous resins appear stained darker than crystalline resins. By using this, one can distinguish between domains of binder resins and any other material and between domains of crystalline and amorphous resins.

To be more specific, domains of any material other than binder resins are stained the lightest with ruthenium, crystalline-resin (e.g., crystalline polyester resin) domains the second lightest, and amorphous-resin (e.g., amorphous polyester resin) domains are stained the darkest. The contrast may be adjusted to make miscellaneous domains look white, amorphous-resin domains look black, and crystalline-resin domains look light gray. Now each domain can be identified by color.

The ruthenium-stained crystalline-resin domains are then examined to determine the relative area of crystalline-resin domains to the particle cross-sectional area in the toner particles.

Instead of isolated toner particles, the relative areas of crystalline-resin domains may be measured on toner containing the toner particles of interest and external additives or a classified fraction of the toner.

Classification of the Toner Particles

The classified toner particles are obtained by classifying the toner particles to make the percentage of toner particles having a diameter equal to or larger than the volume-average diameter D50v of the full-range toner particles 10% by number of less.

Specifically, the toner particles are classified using a classifier (e.g., an elbow-jet classifier (EJ-LABO, Nittetsu Mining)) to remove toner particles having a diameter equal to or larger than D50v. This will give the classified toner particles, a fraction of the toner particles in which toner particles having a diameter equal to or larger than the volume-average diameter D50v of the full-range toner particles 10% by number of less.

Instead of isolated toner particles, the characteristics described above may be measured on a classified fraction of toner obtained by classifying toner containing the toner particles of interest and external additives.

Construction of the Toner Particles

The toner particles contain, for example, binder resins and at least one coloring agent, optionally with a release agent and/or other additives.

Binder Resins

Examples of binder resins include vinyl resins that are homopolymers of monomers such as styrenes (e.g., styrene, para-chlorostyrene, and α-methylstyrene), (meth)acrylates (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenic unsaturated nitriles (e.g., acrylonitrile and methacrylonitrile), vinyl ethers (e.g., vinyl methyl ether and vinyl isobutyl ether), vinyl ketones (e.g., vinyl methyl ketone, vinyl ethyl ketone, and vinyl isopropenyl ketone), and olefins (e.g., ethylene, propylene, and butadiene) or copolymers of two or more such monomers.

Non-vinyl resins, such as epoxy resins, polyester resins, polyurethane resins, polyamide resins, cellulose resins, polyether resins, and modified rosin, mixtures of any such resin and vinyl resin(s), and graft copolymers obtained by polymerizing a vinyl monomer in the presence of any such non-vinyl resin may also be used.

Two or more such binders are used in combination.

In particular, the binder resins include an amorphous resin and a crystalline resin.

The ratio by mass between the amorphous and crystalline resins (crystalline/amorphous) may be 3/97 or more and 50/50 or less. Preferably, this ratio is 7/93 or more and 30/70 or less.

For the classified toner particles, the ratio by mass between the amorphous and crystalline resins (crystalline/amorphous) may be 10/90 or more and 30/70 or less.

The difference (absolute) between the solubility parameter of the amorphous resin and that of the crystalline resin may be 0.2 or more and 1.0 or less. Preferably, this difference is 0.50 or more and 0.90 or less, more preferably 0.65 or more and 0.80 or less.

When the difference between the solubility parameter of the amorphous resin and that of the crystalline resin is in any of these ranges, the resulting image will be even more weatherable. In that case the crystals of the crystalline resin will continue to grow inside the image, helping the resin form large domains. The crystal structure of the resin, therefore, will become more effective over time in reducing the penetration of visible light into the image by scattering incoming light.

The solubility parameter (SP) used here is that estimated by Fedors method. Specifically, the solubility parameter (SP) is estimated according to the equation below, for example following the description in Polym. Eng. Sci., vol. 14, p. 147 (1974):

$$SP=\sqrt{(Ev/v)}=\sqrt{(\Sigma\Delta ei/\Sigma\Delta vi)}$$

(where Ev is the energy of vaporization (cal/mol), v is the molar volume ($cm^3$/mol), Δei is the energy of vaporization of each atom or atomic group, and Δvi is the molar volume of each atom or atomic group).

The unit of the solubility parameter (SP) is $(cal/cm^3)^{1/2}$. In the present disclosure, however, solubility parameters are expressed as dimensionless values following the common practice.

An amorphous resin herein represents a resin whose DSC curve, a thermal spectrum measured by differential scanning calorimetry, has no clear endothermic peak and only shows stepwise endothermic changes. An amorphous resin is solid at room temperature and thermoplasticizes at temperatures equal to or higher than its glass transition temperature.

A crystalline resin, by contrast, is a resin whose DSC curve has a clear endothermic peak rather than stepwise endothermic changes.

To take a specific example, if a crystalline resin is analyzed by DSC at a heating rate of 10° C./min, the DSC curve has an endothermic peak with a half width of 10° C. or narrower. If an amorphous resin is analyzed likewise, the DSC curve has an endothermic peak with a half width broader than 10° C. or no clear endothermic peak.

The amorphous resin may be as described below.

Examples of amorphous resins include known amorphous resins, such as amorphous polyester resins, amorphous vinyl resins (e.g., styrene-acrylic resins), epoxy resins, polycarbonate resins, and polyurethane resins. Of these, it is preferred to use an amorphous polyester or vinyl (styrene-acrylic in particular) resin, more preferably an amorphous polyester resin.

A combination of amorphous polyester and styrene-acrylic resins may also be used. The amorphous resin may even be one that has a segment of amorphous polyester resin and a segment of styrene-acrylic resin.

Amorphous Polyester Resin

An example of an amorphous polyester resin is a polycondensate of polycarboxylic acid(s) and polyhydric alcohol (s). Either commercially available or synthesized amorphous polyester resins may be used.

Examples of polycarboxylic acids include aliphatic dicarboxylic acids (e.g., oxalic acid, malonic acid, maleic acid, fumaric acid, citraconic acid, itaconic acid, glutaconic acid, succinic acid, alkenylsuccinic acids, adipic acid, and sebacic acid), alicyclic dicarboxylic acids (e.g., cyclohexanedicarboxylic acid), aromatic dicarboxylic acids (e.g., terephthalic acid, isophthalic acid, phthalic acid, and naphthalenedicarboxylic acid), and anhydrides and lower-alkyl (e.g., C1-5 alkyl) esters thereof. Of these, aromatic dicarboxylic acids are preferred.

A combination of a dicarboxylic acid and a crosslinked or branched carboxylic acid having three or more carboxylic groups may also be used. Examples of carboxylic acids having three or more carboxylic groups include trimellitic acid, pyromellitic acid, and anhydrides and lower-alkyl (e.g., C1-5 alkyl) esters thereof.

One polycarboxylic acid may be used alone, or two or more may be used in combination.

Examples of polyhydric alcohols include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexanedimethanol, and hydrogenated bisphenol A), and aromatic diols (e.g., ethylene oxide adducts of bisphenol A and propylene oxide adducts of bisphenol A). Of these, aromatic diols and alicyclic diols are preferred, and aromatic diols are more preferred.

A combination of a diol and a crosslinked or branched polyhydric alcohol having three or more hydroxyl groups may also be used. Examples of polyhydric alcohols having three or more hydroxyl groups include glycerol, trimethylolpropane, and pentaerythritol.

One polyhydric alcohol may be used alone, or two or more may be used in combination.

An amorphous polyester resin can be produced by known methods. A specific example is to polymerize the raw materials at a temperature of 180° C. or more and 230° C. or less. The pressure in the reaction system may optionally be reduced to remove the water and alcohol that are produced as condensation proceeds. If the raw-material monomers do not dissolve or are not miscible together at the reaction temperature, a high-boiling solvent may be added as a solubilizer to make the monomers dissolve. In that case, the solubilizer is removed by distillation during the polycondensation. Any monomer not miscible with the other(s) may be condensed with the planned counterpart acid(s) or alcohol(s) before the polycondensation process.

Besides native amorphous polyester resins, modified amorphous polyester resins may also be used. A modified amorphous polyester resin is an amorphous polyester resin having a non-ester linking group or containing a non-polyester resin component bound by covalent, ionic, or any other form of bonding. An example is a terminally modified resin obtained by reacting a terminally functionalized amorphous polyester resin, for example having a terminal isocyanate group, with an active hydrogen compound.

The amorphous polyester resin may constitute 60% by mass or more and 98% by mass or less of all binder resins. Preferably, the amorphous polyester resin constitutes 65% by mass or more and 95% by mass or less, more preferably 70% by mass or more and 90% by mass or less, of all binder resins.

Styrene-Acrylic Resin

A styrene-acrylic resin is a copolymer of at least a styrene monomer (monomer having the styrene structure) and a (meth)acrylic monomer (monomer having a (meth)acrylic group, preferably a (meth)acryloxy group). Examples of styrene-acrylic resins include copolymers of a styrene monomer and a (meth)acrylate monomer.

A styrene-acrylic resin has an acrylic-resin substructure formed by the polymerization of an acrylic monomer, methacrylic monomer, or both. The expression "(meth)acrylic" encompasses both "acrylic" and "methacrylic," and the expression "(meth)acrylate" encompasses both an "acrylate" and a "methacrylate."

Examples of styrene monomers include styrene, α-methylstyrene, meta-chlorostyrene, para-chlorostyrene, para-fluorostyrene, para-methoxystyrene, meta-tert-butoxystyrene, para-tert-butoxystyrene, para-vinylbenzoic acid, and para-methyl-α-methylstyrene. One styrene monomer may be used alone, or two or more may be used in combination.

Examples of (meth)acrylic monomers include (meth) acrylic acid, methyl (meth)acrylate, ethyl (meth)acrylate, n-propyl (meth)acrylate, isopropyl (meth)acrylate, n-butyl (meth)acrylate, isobutyl (meth)methacrylate, n-hexyl (meth) acrylate, 2-ethylhexyl (meth)acrylate, lauryl (meth)acrylate, stearyl (meth)acrylate, cyclohexyl (meth)acrylate, dicyclopentanyl (meth)acrylate, isobornyl (meth)acrylate, 2-hydroxyethyl (meth)acrylate, hydroxypropyl (meth)acrylate, and 4-hydroxybutyl (meth)acrylate. One (meth)acrylic monomer may be used alone, or two or more may be used in combination.

The ratio between the styrene and (meth)acrylic monomers in the polymerization may be between 70:30 and 95:5 (styrene:(meth)acrylic) on a mass basis.

A crosslinked styrene-acrylic resin may also be used. An example is a copolymer of at least a styrene monomer, a (meth)acrylic monomer, and a crosslinking monomer. The crosslinking monomer can be of any kind, but an example is a (meth)acrylate compound having two or more functional groups.

How to produce the styrene-acrylic resin is not critical. Techniques such as solution polymerization, precipitation polymerization, suspension polymerization, bulk polymerization, and emulsion polymerization can be used. The polymerization reactions can be done by known processes (batch, semicontinuous, continuous, etc.).

The styrene-acrylic resin may constitute 0% by mass or more and 20% by mass or less of all binder resins. Preferably, the styrene-acrylic resin constitutes 1% by mass or more and 15% by mass or less, more preferably 2% by mass or more and 10% by mass or less, of all binder resins.

Amorphous Resin Having a Segment of Amorphous Polyester Resin and a Segment of Styrene-Acrylic Resin (hereinafter also referred to as "hybrid amorphous resin")

A hybrid amorphous resin is an amorphous resin having a segment of amorphous polyester resin and a segment of styrene-acrylic resin chemically bound together.

Examples of hybrid amorphous resins include resins having a polyester backbone and styrene-acrylic side chains chemically bound to the backbone; resins having a styrene-acrylic backbone and polyester side chains chemically bound to the backbone; resins whose backbone is formed by polyester and styrene-acrylic resins chemically bound together; and resins having a backbone formed by polyester and styrene-acrylic resins chemically bound together and polyester and/or styrene-acrylic side chains chemically bound to the backbone.

The amorphous polyester and styrene-acrylic resins in each segment are not described; they are as described above.

The combined percentage of the polyester and styrene-acrylic segments to the hybrid amorphous resin as a whole may be 80% by mass or more. Preferably, this percentage is 90% by mass or more, more preferably 95% by mass or more, even more preferably 100% by mass.

In a hybrid amorphous resin, the percentage of the styrene-acrylic-resin segment to the polyester and styrene-acrylic segments combined may be 20% by mass or more and 60% by mass or less. Preferably, this percentage is 25% by mass or more and 55% by mass or less, more preferably 30% by mass or more and 50% by mass or less.

A hybrid amorphous resin may be produced by any of methods (i) to (iii) below.

(i) The polyester segment is produced by polycondensation between polyhydric alcohol(s) and polycarboxylic acid(s). Then the monomer that will form the styrene-acrylic segment is polymerized by addition polymerization.

(ii) The styrene-acrylic segment is produced by addition polymerization of a monomer capable of this type of polymerization. Then polyhydric alcohol(s) and polycarboxylic acid(s) are polycondensed.

(iii) Polyhydric alcohol(s) and polycarboxylic acid(s) are polycondensed, and a monomer capable of addition polymerization is polymerized by addition polymerization at the same time.

The hybrid amorphous resin may constitute 60% by mass or more and 98% by mass or less of all binder resins. Preferably, the hybrid amorphous resin constitutes 65% by mass or more and 95% by mass or less, more preferably 70% by mass or more and 90% by mass or less, of all binder resins.

Some characteristics of the amorphous resin may be as follows.

The glass transition temperature (Tg) of the amorphous resin may be 50° C. or more and 80° C. or less. Preferably, Tg is 50° C. or more and 65° C. or less.

This glass transition temperature is that determined from the DSC curve of the resin, which is measured by differential scanning calorimetry (DSC). More specifically, this glass transition temperature is the "extrapolated initial temperature of glass transition" as in the methods for determining glass transition temperatures set forth in JIS K 7121: 1987 "Testing Methods for Transition Temperatures of Plastics."

The weight-average molecular weight (Mw) of the amorphous resin may be 5000 or more and 1000000 or less. Preferably, Mw is 7000 or more and 500000 or less.

The number-average molecular weight (Mn) of the amorphous resin may be 2000 or more and 100000 or less.

The molecular weight distribution, Mw/Mn, of the amorphous resin may be 1.5 or more and 100 or less. Preferably, Mw/Mn is 2 or more and 60 or less.

These weight- and number-average molecular weights are those measured by gel permeation chromatography (GPC). The analyzer is Tosoh's HLC-8120 GPC chromatograph with Tosoh's TSKgel SuperHM-M column (15 cm), and the eluate is tetrahydrofuran (THF). Comparing the measured data with a molecular-weight calibration curve prepared using monodisperse polystyrene standards will give the weight- and number-average molecular weights.

The crystalline resin may be as described below.

Examples of crystalline resins include known crystalline resins, such as crystalline polyester resins and crystalline vinyl resins (e.g., polyalkylene resins and long-chain alkyl (meth)acrylate resins). Of these, it is preferred to use a crystalline polyester resin; this may improve the mechanical strength and fixation at low temperatures of the toner.

Crystalline Polyester Resin

An example of a crystalline polyester resin is a polycondensate of polycarboxylic acid(s) and polyhydric alcohol(s). Either commercially available or synthesized crystalline polyester resins may be used.

Crystalline polyester resins made with linear aliphatic polymerizable monomers form a crystal structure more easily than those made with aromatic polymerizable monomers.

Examples of polycarboxylic acids include aliphatic dicarboxylic acids (e.g., oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (e.g., dibasic acids, such as phthalic acid, isophthalic acid, terephthalic acid, and naphthalene-2,6-dicarboxylic acid), and anhydrides and lower-alkyl (e.g., C1-5 alkyl) esters thereof.

A combination of a dicarboxylic acid and a crosslinked or branched carboxylic acid having three or more carboxylic groups may also be used. Examples of carboxylic acids having three or more carboxylic groups include aromatic carboxylic acids (e.g., 1,2,3-benzenetricarboxylic acid, 1,2,4-benzenetricarboxylic acid, and 1,2,4-naphthalenetricarboxylic acid) and anhydrides and lower-alkyl (e.g., C1-5 alkyl) esters thereof.

A combination of a dicarboxylic acid such as listed above and a dicarboxylic acid having a sulfonic acid group or an ethylenic double bond may also be used.

One polycarboxylic acid may be used alone, or two or more may be used in combination.

Examples of polyhydric alcohols include aliphatic diols (e.g., C7-20 linear aliphatic diols). Examples of aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Of these, 1,8-octanediol, 1,9-nonanediol, and 1,10-decanediol are preferred.

A combination of a diol and a crosslinked or branched alcohol having three or more hydroxyl groups may also be used. Examples of alcohols having three or more hydroxyl groups include glycerol, trimethylolethane, trimethylolpropane, and pentaerythritol.

One polyhydric alcohol may be used alone, or two or more may be used in combination.

In the polyhydric alcohol(s), the percentage of aliphatic diols may be 80 mol % or more. Preferably, the percentage of aliphatic diols is 90 mol % or more.

A crystalline polyester resin can be produced by known methods, for example in the same way as an amorphous polyester resin.

The crystalline polyester resin may be a polymer formed by linear aliphatic α,ω-dicarboxylic acid(s) and linear aliphatic α,ω-diol(s).

The linear aliphatic α,ω-dicarboxylic acid(s) may be one(s) having a C3 to C14 alkylene group between the two carboxy groups. Preferably, the number of carbon atoms in the alkylene group is 4 or more and 12 or less, more preferably 6 or more and 10 or less.

Examples of linear aliphatic α,ω-dicarboxylic acids include succinic acid, glutaric acid, adipic acid, 1,6-hexanedicarboxylic acid (commonly known as suberic acid), 1,7-heptanedicarboxylic acid (commonly known as azelaic acid), 1,8-octanedicarboxylic acid (commonly known as sebacic acid), 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid. Of these, 1,6-hexanedicarboxylic acid, 1,7-heptanedicarboxylic acid, 1,8-octanedicarboxylic acid, 1,9-nonanedicarboxylic acid, and 1,10-decanedicarboxylic acid are preferred.

One linear aliphatic α,ω-dicarboxylic acid may be used alone, or two or more may be used in combination.

The linear aliphatic α,ω-diol(s) may be one(s) having a C3 to C14 alkylene group between the two hydroxy groups. Preferably, the number of carbon atoms in the alkylene group is 4 or more and 12 or less, more preferably 6 or more and 10 or less.

Examples of linear aliphatic α,ω-diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Of these, 1,6-hexanediol, 1,7-heptanediol, 1,8-octanediol, 1,9-nonanediol, and 1,10-decanediol are preferred.

One linear aliphatic α,ω-diol may be used alone, or two or more may be used in combination.

Preferably, the polymer, formed by linear aliphatic α,ω-dicarboxylic acid(s) and linear aliphatic α,ω-diol(s), is formed by at least one selected from the group consisting of 1,6-hexanedicarboxylic acid, 1,7-heptanedicarboxylic acid, 1,8-octanedicarboxylic acid, 1,9-nonanedicarboxylic acid, and 1,10-decanedicarboxylic acid and at least one selected from the group consisting of 1,6-hexanediol, 1,7-heptanediol, 1,8-octanediol, 1,9-nonanediol, and 1,10-decanediol, more preferably by 1,10-decanedicarboxylic acid and 1,6-hexanediol.

The crystalline polyester resin may constitute 1% by mass or more and 20% by mass or less of all binder resins. Preferably, the crystalline polyester resin constitutes 2% by mass or more and 15% by mass or less, more preferably 3% by mass or more and 10% by mass or less, of all binder resins.

Some characteristics of the crystalline resin may be as follows.

The melting temperature of the crystalline resin may be 50° C. or more and 100° C. or less. Preferably, the melting temperature is 55° C. or more and 90° C. or less, more preferably 60° C. or more and 85° C. or less.

This melting temperature is the "peak melting temperature" of the resin as in the methods for determining melting temperatures set forth in JIS K 7121: 1987 "Testing Methods for Transition Temperatures of Plastics" and is determined from the DSC curve of the resin, which is measured by differential scanning calorimetry (DSC).

The weight-average molecular weight (Mw) of the crystalline resin may be 6,000 or more and 35,000 or less.

The binder resin content may be 40% by mass or more and 95% by mass or less of the toner particles as a whole. Preferably, the binder resin content is 50% by mass or more and 90% by mass or less, more preferably 60% by mass or more and 85% by mass or less.

Coloring Agent

Examples of coloring agents include pigments, such as carbon black, chrome yellow, Hansa yellow, benzidine yellow, threne yellow, quinoline yellow, pigment yellow, permanent orange GTR, pyrazolone orange, Vulcan orange, Watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, Calco oil blue, methylene blue chloride, phthalocyanine blue, pigment blue, phthalocyanine green, and malachite green oxalate; and dyes, such as acridine, xanthene, azo, benzoquinone, azine, anthraquinone, thioindigo, dioxazine, thiazine, azomethine, indigo, phthalocyanine, aniline black, polymethine, triphenylmethane, diphenylmethane, and thiazole dyes.

One coloring agent may be used alone, or two or more may be used in combination.

In particular, the coloring agent may be at least one of an insoluble monoazo pigment or an insoluble disazo pigment.

Insoluble monoazo and disazo pigments are prone to photodegradation. Even with a highly photodegradable insoluble monoazo and/or disazo pigment, however, the toner gives highly weatherable images because the crystal structure formed by the crystalline resin in the toner particles will reduce the penetration of visible light into the image by scattering incoming light.

Being "insoluble" herein means the solubility of the substance in water at 25° C. is 0.01% by mass or less.

Examples of insoluble monoazo pigments include Pigment Yellow 74, 97, 116, 120, 151, and 154.

Examples insoluble disazo pigments include Pigment Yellow 81, 83, and 155.

Surface-treated coloring agents may optionally be used. A combination of a coloring agent and a dispersant may also be used. It is also possible to use multiple coloring agents in combination.

The coloring agent content may be 1% by mass or more and 30% by mass or less of the toner particles as a whole. Preferably, the coloring agent content is 3% by mass or more and 15% by mass or less.

For the classified toner particles, the coloring agent content may be 0% by mass or more and 30% by mass or less.

Release Agent

Examples of release agents include hydrocarbon waxes; natural waxes, such as carnauba wax, rice wax, and candelilla wax; synthesized or mineral/petroleum waxes, such as montan wax; and ester waxes, such as fatty acid esters and montanates. Other release agents may also be used.

The melting temperature of the release agent may be 50° C. or more and 110° C. or less. Preferably, the melting temperature is 60° C. or more and 100° C. or less.

The melting temperature of the release agent is the "peak melting temperature" of the agent as in the methods for determining melting temperatures set forth in JIS K 7121: 1987 "Testing Methods for Transition Temperatures of Plastics" and is determined from the DSC curve of the agent, which is measured by differential scanning calorimetry (DSC).

The release agent content may be 1% by mass or more and 20% by mass or less of the toner particles as a whole. Preferably, the release agent content is 5% by mass or more and 15% by mass or less.

Other Additives

Examples of other additives include known additives, such as magnetic substances, charge control agents, and inorganic powders. Such additives, if used, are contained in the toner particles as internal additives.

Characteristics of the Toner Particles

The toner particles may be single-layer toner particles or may be "core-shell" toner particles, i.e., toner particles formed by a core (core particle) and a coating that covers the core (shell layer).

A possible structure of core-shell toner particles is one in which the core contains the binder resins together with the coloring agent, release agent, and/or other additives if used, and the coating contains the binder resins.

The volume-average diameter of the toner particles (D50v) may be 2 μm or more and 10 μm or less. Preferably, D50v is 4 μm or more and 8 μm or less.

The average diameters and geometric standard deviations of toner particles indicated herein are those measured using Coulter Multisizer II (Beckman Coulter) and ISOTON-II electrolyte (Beckman Coulter).

For measurement, a sample of the toner particles, 0.5 mg or more and 50 mg or less, is added to 2 ml of a 5% by mass aqueous solution of a surfactant as a dispersant (e.g., a sodium alkylbenzene sulfonate). The resulting dispersion is added to 100 ml or more and 150 ml or less of the electrolyte.

The electrolyte with the suspended sample therein is sonicated for 1 minute using a sonicator, and the size distribution is measured on 50000 sampled particles within a diameter range of 2 μm to 60 μm using Coulter Multisizer II with an aperture size of 100 μm.

The measured distribution is divided into segments by particle size (channels), and the cumulative distribution of volume and that of frequency are plotted starting from the smallest diameter. The particle diameter at which the cumulative volume is 16% and that at which the cumulative frequency is 16% are defined as volume diameter D16v and number diameter D16p, respectively, of the toner particles. The particle diameter at which the cumulative volume is 50% and that at which the cumulative frequency is 50% are defined as the volume-average diameter D50v and cumulative number-average diameter D50p, respectively, of the toner particles. The particle diameter at which the cumulative volume is 84% and that at which the cumulative frequency is 84% are defined as volume diameter D84v and number diameter D84p, respectively, of the toner particles.

These are used to calculate the geometric standard deviation by volume (GSDv) and geometric standard deviation by number (GSDp). GSDv is given by $(D84v/D16v)^{1/2}$, and GSDp is given by $(D84p/D16p)^{1/2}$.

The average circularity of the toner particles may be 0.94 or more and 1.00 or less. Preferably, the average circularity is 0.95 or more and 0.98 or less.

The average circularity of the toner particles is given by (circumference of the equivalent circle)/(circumference) [(circumference of circles having the same projected area as particle images)/(circumference of projected images of the particles)]. Specifically, the average circularity of the toner particles can be measured as follows.

A portion of the toner particles of interest is collected by aspiration in such a manner that it will form a flat stream. This flat stream is photographed with a flash to capture the figures of the particles in a still image. The images of 3500 sampled particles are analyzed using a flow particle-image analyzer (Sysmex FPIA-3000), and the average circularity is determined from the results.

If the toner contains external additives, the external additives are removed beforehand by dispersing the toner (developer) of interest in water containing a surfactant and then sonicating the resulting dispersion.

External Additives

An example of an external additive is inorganic particles. Examples of inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO\cdot SiO_2$, $K_2O\cdot(TiO_2)_n$, $Al_2O_3\cdot 2SiO_2$, $CaCO_3$, $MgCO_3$, $BaSO_4$, and $MgSO_4$.

The surface of the inorganic particles may be hydrophobic, for example as a result of being immersed in a hydrophobizing agent. The hydrophobizing agent can be of any kind, but examples include silane coupling agents, silicone oil, titanate coupling agents, and aluminum coupling agents. One such agent may be used alone, or two or more may be used in combination. The amount of the hydrophobizing agent is usually, for example, 1 part by mass or more and 10 parts by mass or less per 100 parts by mass of the inorganic particles.

Materials like resin particles (particles of polystyrene, polymethyl methacrylate, melamine resins, etc.) and active cleaning agents (e.g., metal salts of higher fatty acids, typically zinc stearate, and particles of fluoropolymers) are also examples of external additives.

The percentage of external additives may be 0.01% by mass or more and 5% by mass or less of the toner particles. Preferably, this percentage is 0.01% by mass or more and 2.0% by mass or less.

Production of the Toner

Toner according to this exemplary embodiment can be obtained by producing the toner particles and then adding external additives.

The toner particles can be produced either by a dry process (e.g., kneading and milling) or by a wet process (e.g., aggregation and coalescence, suspension polymerization, or dissolution and suspension). Any known dry or wet process may be used to produce the toner particles.

The following describes an example of how to produce the toner particles by kneading and milling by way of example.

Kneading and milling is a process for producing toner particles in which, for example, binder resins including amorphous and crystalline resins and a coloring agent are melted and kneaded together, the kneaded mixture is milled, and then the milled product is classified. The process includes, for example, kneading, in which ingredients including binder resins and a coloring agent are melted and kneaded together; cooling, in which the molten mixture is cooled; milling, in which the cooled mixture is milled; and classification, in which the milled product is classified.

In this process of kneading and milling, the milling is carried out after domains of crystalline resin have grown large in the kneaded mixture. This ensures the finished toner particles will include crystalline-scarce, large-diameter toner particles and crystalline-rich, small-diameter toner particles.

If there are well grown domains of crystalline resin in the kneaded mixture when it is milled, the milling will break the mixture at the crystalline-resin domains. The product, therefore, will contain many domains of crystalline resin.

In consequence, the resulting toner particles will include crystalline-rich, small-diameter toner particles.

The following describes the details of kneading-and-milling production of the toner particles.

Kneading

Ingredients including binder resins and a coloring agent are melted and kneaded together. The binder resins include amorphous and crystalline resins.

Examples of kneaders that can be used include three-roll, single-screw, twin-screw, and Banbury-mixer kneaders.

The temperature at which the materials are melted can be determined according to the binder resins and coloring agent used, their proportions, etc.

Cooling

The kneaded mixture is then cooled.

For example, the mixture is cooled from its temperature at the end of kneading to 40° C. or below at an average rate of 5° C./sec or faster. This may help domains of crystalline resin grow well in the kneaded mixture.

The average rate in this context is the average speed of cooling of the kneaded mixture from its temperature at the end of kneading to 40° C.

An example of a method for cooling is the use of a combination of rollers and a belt therebeneath with circulating cold water or brine. If this method is used, the rate of cooling is determined by the speed of the rollers, the flow rate of the water or brine, the supply rate of the kneaded mixture, the thickness of the slab on which the mixture is rolled, etc.

Milling

The cooled mixture is then milled into particles, for example using a mechanical mill or jet mill.

Before being milled, the mixture may be warmed to a temperature not exceeding the melting point of the crystalline resin (below the melting temperature of the crystalline resin; e.g., the melting temperature minus 10° C.). This may help domains of crystalline resin grow well in the mixture.

Classification

The milled product (particles) may optionally be classified to give the toner particles the desired average diameter.

A centrifugal, inertial, or any other commonly used classifier is used to eliminate undersized powder (particles smaller than the desired range of diameters) and oversized powder (particles larger than the desired range of diameters).

Hot-Air Blow

The classified particles may be blown with hot air to give the toner particles the desired circularity.

In this way, toner particles including crystalline-rich, small-diameter toner particles are obtained.

It should be noted that this is not the only possible process for producing the toner particles. The toner particles may be produced by preparing separate collections of toner particles, crystalline-rich, small-diameter ones corresponding to the aforementioned classified toner particles and crystalline-scarce, large-diameter ones, by an ordinary method and then mixing them together.

Then toner according to this exemplary embodiment is produced, for example by adding external additives while the toner particles are dry, and mixing them together. The mixing can be performed using, for example, a V-blender, Henschel mixer, or Lödige mixer. Optionally, oversized particles of toner may be removed, for example using a vibrating sieve or air-jet sieve.

Electrostatic Charge Image Developer

An electrostatic charge image developer according to an exemplary embodiment contains at least toner according to any of the above exemplary embodiments.

The electrostatic charge image developer according to this exemplary embodiment may be a one-component developer, which is substantially toner according to any of the above exemplary embodiments, or may be a two-component developer, which is a mixture of the toner and a carrier.

The carrier can be of any kind and can be a known one. Examples include a coated carrier, formed by a core magnetic powder and a coating resin on its surface; a magnetic powder-dispersed carrier, formed by a matrix resin and a magnetic powder dispersed therein; and a resin-impregnated carrier, which is a porous magnetic powder impregnated with resin.

The particles as a component of a magnetic powder-dispersed or resin-impregnated carrier can serve as the core material; a carrier obtained by coating the surface of them with resin may also be used.

The magnetic powder can be, for example, a powder of a magnetic metal, such as iron, nickel, or cobalt, or a powder of a magnetic oxide, such as ferrite or magnetite.

The coating or matrix resin can be, for example, polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, a straight silicone resin (resin having organosiloxane bonds) or its modified form, a fluoropolymer, polyester, polycarbonate, a phenolic resin, or an epoxy resin.

The coating or matrix resin may contain additives, such as electrically conductive particles.

Examples of electrically conductive particles include particles of metal, such as gold, silver, or copper, and particles of carbon black, titanium oxide, zinc oxide, tin oxide, barium sulfate, aluminum borate, and potassium titanate.

The resin coating of the surface of the core material can be achieved by, for example, coating the surface with a coating-layer solution prepared by dissolving the coating resin in a solvent, optionally with additives. The solvent can be of any kind and can be selected considering, for example, the coating resin used and suitability for coating.

Specific examples of how to provide the resin coating include dipping, i.e., immersing the core material in the coating-layer solution; spraying, i.e., applying a mist of the coating-layer solution onto the surface of the core material; fluidized bed coating, i.e., applying a mist of the coating-layer solution to core material floated on a stream of air; and kneader-coater coating, i.e., mixing the carrier core material and the coating-layer solution in a kneader-coater and removing the solvent.

If the developer is two-component, the mix ratio (by mass) between the toner and the carrier may be between 1:100 (toner:carrier) and 30:100. Preferably, the mix ratio is between 3:100 and 20:100.

Image Forming Apparatus/Image Forming Method

The following describes an image forming apparatus/image forming method according to an exemplary embodiment.

An image forming apparatus according to this exemplary embodiment includes an image carrier; a charging component that charges the surface of the image carrier; an electrostatic charge image creating component that creates an electrostatic charge image on the charged surface of the image carrier; a developing component that contains an electrostatic charge image developer and develops, using the electrostatic charge image developer, the electrostatic charge image on the surface of the image carrier to form a toner image; a transfer component that transfers the toner image on the surface of the image carrier to the surface of a recording medium; and a fixing component that fixes the toner image on the surface of the recording medium. The electrostatic charge image developer is an electrostatic charge developer according to the above exemplary embodiment.

The image forming apparatus according to this exemplary embodiment performs an image forming method that includes charging the surface of an image carrier; creating an electrostatic charge image on the charged surface of the image carrier; developing, using an electrostatic charge image developer according to the above exemplary embodiment, the electrostatic charge image on the surface of the image carrier to form a toner image; transferring the toner image on the surface of the image carrier to the surface of a recording medium; and fixing the toner image on the surface of the recording medium (image forming method according to this exemplary embodiment).

The configuration of the image forming apparatus according to this exemplary embodiment can be applied to well-known types of image forming apparatuses. Examples include a direct-transfer image forming apparatus, which forms a toner image on the surface of an image carrier and transfers it directly to a recording medium; an intermediate-transfer image forming apparatus, which forms a toner image on the surface of an image carrier, transfers it to the surface of an intermediate transfer body (first transfer), and then transfers the toner image on the surface of the intermediate transfer body to the surface of a recording medium (second transfer); an image forming apparatus having a cleaning component that cleans the surface of the image carrier between the transfer of the toner image and charging; and an image forming apparatus having a static eliminator that removes static electricity from the surface of the image carrier by irradiating the surface with antistatic light between the transfer of the toner image and charging.

The transfer component of an intermediate-transfer apparatus may include, for example, an intermediate transfer body, a first transfer component, and a second transfer component. The toner image formed on the surface of the image carrier is transferred to the surface of the intermediate transfer body by the first transfer component (first transfer), and then the toner image on the surface of the intermediate transfer body is transferred to the surface of a recording medium by the second transfer component (second transfer).

Part of the image forming apparatus according to this exemplary embodiment, e.g., a portion including the developing component, may have a cartridge structure, i.e., a structure that allows the part to be detached from and attached to the image forming apparatus (or may be a process cartridge). An example of a process cartridge is one that includes a developing component that contains an electrostatic charge image developer according to the above exemplary embodiment.

The following describes an example of an image forming apparatus according to this exemplary embodiment. This is not the only possible form. Some of its structural elements are described with reference to a drawing.

FIG. 1 is a schematic view of the structure of an image forming apparatus according to this exemplary embodiment.

The image forming apparatus illustrated in FIG. 1 includes first to fourth electrophotographic image forming units 10Y, 10M, 10C, and 10K (image forming component) that produce images in the colors of yellow (Y), magenta (M), cyan (C), and black (K), respectively, based on color-separated image data. These image forming units (hereinafter also referred to simply as "units") 10Y, 10M, 10C, and 10K are arranged in a horizontal row with a predetermined distance therebetween. The units 10Y, 10M, 10C, and 10K may be process cartridges, i.e., units that can be detached from and attached to the image forming apparatus.

Above the units 10Y, 10M, 10C, and 10K in the drawing, an intermediate transfer belt 20 as an intermediate transfer body extends to pass through each of the units. The intermediate transfer belt 20 is wound over a drive roller 22 (right in the drawing) and a support roller 24 (left in the drawing) spaced apart from each other, with the rollers touching the inner surface of the intermediate transfer belt 20, and is driven by them to run in the direction from the first unit 10Y to the fourth unit 10K. The support roller 24 is forced by a spring or similar mechanism, not illustrated in the drawing, to go away from the drive roller 22, thereby placing tension on the intermediate transfer belt 20 wound over the two rollers. On the image-carrying side of the intermediate transfer belt 20 is a cleaning device 30 for the intermediate transfer belt 20 facing the drive roller 22.

The units 10Y, 10M, 10C, and 10K have developing devices (developing component) 4Y, 4M, 4C, and 4K, to which four toners in the colors of yellow, magenta, cyan, and black, respectively, are delivered from toner cartridges 8Y, 8M, 8C, and 8K.

The first to fourth units 10Y, 10M, 10C, and 10K are equivalent in structure. In the following, the first unit 10Y, located upstream of the others in the direction of running of the intermediate transfer belt 20 and forms a yellow image, is described to represent the four units. The second to fourth units 10M, 10C, and 10K are not described; they have structural elements equivalent to those of the first unit 10Y, and these elements are designated with the same numerals as in the first unit 10Y but with the letters M (for magenta), C (for cyan), and K (for black), respectively, in place of Y (for yellow).

The first unit 10Y has a photoreceptor 1Y that acts as an image carrier. Around the photoreceptor 1Y are a charging roller (example of a charging component) 2Y that charges the surface of the photoreceptor 1Y to a predetermined potential; an exposure device (example of an electrostatic charge image creating component) 3 that irradiates the charged surface with a laser beam 3Y produced on the basis of a color-separated image signal to create an electrostatic charge image there; a developing device (example of a developing component) 4Y that supplies charged toner to the electrostatic charge image to develop the electrostatic charge image; a first transfer roller (example of a first transfer component) 5Y that transfers the developed toner image to the intermediate transfer belt 20; and a photoreceptor cleaning device (example of a cleaning component) 6Y that removes residual toner off the surface of the photoreceptor 1Y after the first transfer, arranged in this order.

The first transfer roller 5Y is inside the intermediate transfer belt 20 and faces the photoreceptor 1Y. Each of the first transfer rollers 5Y, 5M, 5C, and 5K is connected to a bias power supply (not illustrated) that applies a first transfer bias to the roller. Each bias power supply is controlled by a controller, not illustrated in the drawing, to change the magnitude of the transfer bias it applies to the corresponding first transfer roller.

The operation of forming a yellow image at the first unit 10Y may be as described below.

First, before the operation, the charging roller 2Y charges the surface of the photoreceptor 1Y to a potential of −600 V to −800 V.

The photoreceptor 1Y is a stack of an electrically conductive substrate (e.g., having a volume resistivity at 20° C. of $1\times10^{-6}$ Ωcm or less) and a photosensitive layer thereon. The photosensitive layer is of high electrical resistance (has the typical resistance of resin) in its normal state, but when it is irradiated with a laser beam 3Y, the resistivity of the irradiated portion changes. Thus, a laser beam 3Y is emitted using the exposure device 3 onto the charged surface of the photoreceptor 1Y in accordance with data for the yellow image sent from a controller, not illustrated in the drawing. The laser beam 3Y hits the photosensitive layer on the surface of the photoreceptor 1Y, creating an electrostatic charge image as a pattern for the yellow image on the surface of the photoreceptor 1Y.

The electrostatic charge image is an image created on the surface of the photoreceptor 1Y by electrical charging and is a so-called negative latent image, created after the charge on the surface of the photoreceptor 1Y flows away in the irradiated portion of the photosensitive layer as a result of a resistivity decrease caused by the exposure to the laser beam 3Y but stays in the portion of the photosensitive layer not irradiated with the laser beam 3Y.

As the photoreceptor 1Y rotates, the electrostatic charge image created on the photoreceptor 1Y is moved to a predetermined development point. At this development point, the electrostatic charge image on the photoreceptor 1Y is visualized (developed) as a toner image by the developing device 4Y.

Inside the developing device 4Y is an electrostatic charge image developer that contains, for example, at least yellow toner and a carrier. The yellow toner is on a developer roller (example of a developer carrier) and has been triboelectrically charged with the same polarity as the charge on the photoreceptor 1Y (negative) as a result of being stirred inside the developing device 4Y. As the surface of the photoreceptor 1Y passes through the developing device 4Y, the yellow toner electrostatically adheres to the uncharged, latent-image portion of the surface of the photoreceptor 1Y and develops the latent image. The photoreceptor 1Y, now having a yellow toner image thereon, then continues rotating at a predetermined speed, transporting the toner image developed thereon to a predetermined first transfer point.

After the arrival of the yellow toner image on the photoreceptor 1Y at the first transfer point, a first transfer bias is applied to the first transfer roller 5Y. An electrostatic force acts on the toner image in the direction from the photoreceptor 1Y toward the first transfer roller 5Y, causing the toner image to be transferred from the photoreceptor 1Y to the intermediate transfer belt 20. The applied transfer bias has the (+) polarity, opposite the polarity of the toner (−), and its amount has been controlled by a controller (not illustrated). For the first unit 10Y, for example, it has been controlled to +10 μA.

Residual toner on the photoreceptor 1Y is removed and collected at the photoreceptor cleaning device 6Y.

The first transfer biases applied to the first transfer rollers 5M, 5C, and 5K of the second, third, and fourth units 10M, 10C, and 10K have also been controlled in the same way as that at the first unit 10Y.

The intermediate transfer belt 20 to which a yellow toner image has been transferred at the first unit 10Y in this way is then transported passing through the second to fourth units 10M, 10C, and 10K sequentially. Toner images in the respective colors are overlaid, completing multilayer transfer.

The intermediate transfer belt 20 that has passed through the first to fourth units and thereby completed multilayer transfer of toner images in four colors then reaches a second transfer section. The second transfer section is formed by the intermediate transfer belt 20, the support roller 24, which touches the inner surface of the intermediate transfer belt 20, and a second transfer roller (example of a second transfer component) 26, which is on the image-carrying side of the intermediate transfer belt 20. Recording paper (example of a recording medium) P is fed to the point of contact between the second transfer roller 26 and the intermediate transfer belt 20 in a timed manner by a feeding mechanism, and a second transfer bias is applied to the support roller 24. The applied transfer bias has the (−) polarity, the same as the polarity of the toner (−). An electrostatic force acts on the toner image in the direction from the intermediate transfer belt 20 toward the recording paper P, causing the toner image to be transferred from the intermediate transfer belt 20 to the recording paper P. The amount of the second transfer bias has been controlled and is determined in accordance with the resistance detected by a resistance detector (not illustrated) that detects the electrical resistance of the second transfer section.

After that, the recording paper P is sent to the point of pressure contact (nip) between a pair of fixing rollers at a fixing device (example of a fixing component) 28. The toner image is fixed on the recording paper P there, giving a fixed image.

The recording paper P to which the toner image is transferred can be, for example, a piece of ordinary printing paper for copiers, printers, etc., of electrophotographic type. Recording media such as overhead-projector (OHP) sheets may also be used.

The use of recording paper P having a smooth surface may help further improve the smoothness of the surface of the fixed image. For example, coated paper, which is paper with a coating, for example of resin, on its surface, or art paper for printing may be used.

The recording paper P with a completely fixed color image thereon is transported to an ejection section to finish the formation of a color image.

Process Cartridge/Toner Cartridge

The following describes a process cartridge according to an exemplary embodiment.

A process cartridge according to this exemplary embodiment includes a developing component that contains an electrostatic charge image developer according to an above exemplary embodiment and develops, using the electrostatic charge image developer, an electrostatic charge image created on the surface of an image carrier to form a toner image. The process cartridge can be attached to and detached from an image forming apparatus.

This is not the only possible configuration of a process cartridge according to this exemplary embodiment. Besides the developing component, the process cartridge may optionally have at least one extra component selected from an image carrier, a charging component, an electrostatic charge image creating component, a transfer component, etc.

The following describes an example of a process cartridge according to this exemplary embodiment. This is not the only possible form. The following describes some of its structural elements with reference to a drawing.

Figure 2:
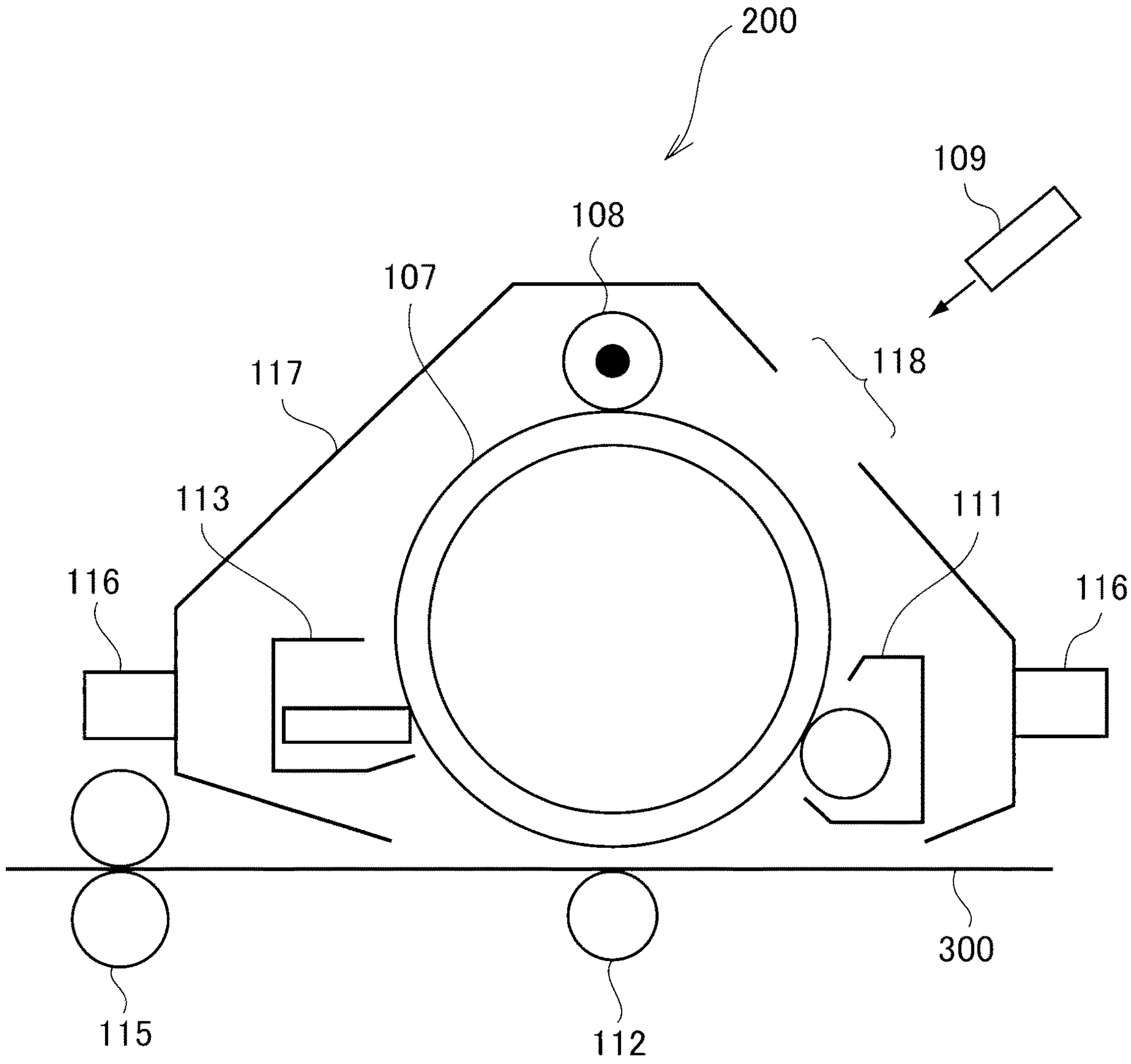
FIG. 2 is a schematic view of the structure of an example of a process cartridge according to an exemplary embodiment that is attached to and detached from an image forming apparatus.

FIG. 2 is a schematic view of the structure of a process cartridge according to this exemplary embodiment.

The process cartridge 200 illustrated in FIG. 2 is a cartridge formed by, for example, a housing 117 and components held together therein. The housing 117 has attachment rails 116 and an opening 118 for exposure to light. The components inside the housing 117 include a photoreceptor 107 (example of an image carrier) and a charging roller 108 (example of a charging component), a developing device 111 (example of a developing component), and a photoreceptor cleaning device 113 (example of a cleaning component) disposed around the photoreceptor 107.

FIG. 2 also illustrates an exposure device (example of an electrostatic charge image creating component) 109, a transfer device (example of a transfer component) 112, a fixing device (example of a fixing component) 115, and recording paper (example of a recording medium) 300.

The following describes a toner cartridge according to this exemplary embodiment.

A toner cartridge according to this exemplary embodiment contains toner according to an above exemplary embodiment and can be attached to and detached from an image forming apparatus. A toner cartridge is a cartridge that stores replenishment toner for a developing component placed inside an image forming apparatus.

The image forming apparatus illustrated in FIG. 1 has toner cartridges 8Y, 8M, 8C, and 8K that can be attached to and detached from it. The developing devices 4Y, 4M, 4C, and 4K are connected to their corresponding toner cartridges (or the toner cartridges for their respective colors) by toner feed tubing, not illustrated in the drawing. When there is little toner in a toner cartridge, this toner cartridge is replaced.

EXAMPLES

The following describes exemplary embodiments of the present disclosure in further detail by providing examples, but the exemplary embodiments of the present disclosure are not limited to these examples. In the following description, "parts" and "%" are by mass unless stated otherwise.

Synthesis of Amorphous Polyester Resin (A1)

Terephthalic acid: 68 parts
Fumaric acid: 32 parts
Ethylene glycol: 42 parts
1,5-Pentanediol: 47 parts These materials are put into a flask equipped with a stirrer, a nitrogen inlet tube, a temperature sensor, and a rectifying column. With a nitrogen stream into the flask, the temperature is increased to 220° C. over 1 hour. One part of titanium tetraethoxide is added to a total of 100 parts of the above materials. The temperature is increased to 240° C. over 0.5 hours while water is removed by distillation as it is formed. After 1 hour of dehydration condensation at 240° C., the reaction product is cooled. The resulting resin is amorphous polyester resin (A1). Its weight-average molecular weight is 97000, its glass transition temperature is 60° C., and its solubility parameter (SP) is 9.91.

Synthesis of Amorphous Polyester Resin (A2)

Terephthalic acid: 39 parts
Fumaric acid: 17 parts
Ethylene glycol: 53 parts
1,5-Pentanediol: 62 parts A resin is synthesized in the same way as amorphous polyester resin (A1) except that the amounts of materials are changed as listed above. The resulting resin is amorphous polyester resin (A2). Its weight-average molecular weight is 108000, its glass transition temperature is 58° C., and its solubility parameter (SP) is 9.28.

Synthesis of Amorphous Polyester Resin (A3)

Terephthalic acid: 42 parts
Fumaric acid: 17 parts
Ethylene glycol: 53 parts
1,5-Pentanediol: 59 parts A resin is synthesized in the same way as amorphous polyester resin (A1) except that the amounts of materials are changed as listed above. The resulting resin is amorphous polyester resin (A3). Its weight-average molecular weight is 98000, its glass transition temperature is 57° C., and its solubility parameter (SP) is 9.34.

Synthesis of Amorphous Polyester Resin (A4)

Terephthalic acid: 67 parts
Fumaric acid: 34 parts
Ethylene glycol: 41 parts
1,5-Pentanediol: 52 parts A resin is synthesized in the same way as amorphous polyester resin (A1) except that the amounts of materials are changed as listed above. The resulting resin is amorphous polyester resin (A4). Its weight-average molecular weight is 92000, its glass transition temperature is 61° C., and its solubility parameter (SP) is 10.10.

Synthesis of Amorphous Polyester Resin (A5)

Terephthalic acid: 67 parts
Fumaric acid: 38 parts
Ethylene glycol: 39 parts
1,5-Pentanediol: 49 parts A resin is synthesized in the same way as amorphous polyester resin (A1) except that the amounts of materials are changed as listed above. The resulting resin is amorphous polyester resin (A5). Its weight-average molecular weight is 94000, its glass transition temperature is 62° C., and its solubility parameter (SP) is 10.19.

Production of Crystalline Polyester Resin (B1)

1,10-Decanedicarboxylic acid: 260 parts
1,6-Hexanediol: 167 parts
Dibutyltin oxide (catalyst): 0.3 parts These materials are put into a three-neck flask dried by heating. After the air in the flask is replaced with nitrogen gas to create an inert atmosphere, the materials are stirred under reflux for 5 hours at 180° C. by mechanical stirring. Then the resulting mixture is heated to 230° C. gently and stirred for 2 hours under reduced pressure. The thickened mixture is air-cooled to terminate the reaction. The resulting resin is crystalline polyester resin (B1). Its weight-average molecular weight is 12500, its melting temperature is 73° C., and its solubility parameter (SP) is 9.13.

Production of Crystalline Polyester Resin (B2)

Adipic acid: 249 parts 1,6-Hexanediol: 201 parts

Dibutyltin oxide (catalyst): 0.3 parts

These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 2.5 hours under reduced pressure. The thickened mixture is air-cooled to terminate the reaction. The resulting resin is crystalline polyester resin (B2). Its weight-average molecular weight is 8000, its melting temperature is 59° C., and its solubility parameter (SP) is 9.63.

Production of Crystalline Polyester Resin (B3)

Sebacic acid: 284 parts 1,6-Hexanediol: 166 parts

Dibutyltin oxide (catalyst): 0.3 parts

These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 2.5 hours under reduced pressure. The thickened mixture is air-cooled to terminate the reaction. The resulting resin is crystalline polyester resin (B3). Its weight-average molecular weight is 10000, its melting temperature is 61° C., and its solubility parameter (SP) is 9.21.

Production of Crystalline Polyester Resin (B4)

1,12-Dodecanedicarboxylic acid: 262 parts 1,12-Dodecanediol: 178 parts

Dibutyltin oxide (catalyst): 0.3 parts

These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 2.5 hours under reduced pressure. The thickened mixture is air-cooled to terminate the reaction. The resulting resin is crystalline polyester resin (B4). Its weight-average molecular weight is 18000, its melting temperature is 109° C., and its solubility parameter (SP) is 8.93.

Production of Crystalline Polyester Resin (B5)

1,16-Hexadecanedicarboxylic acid: 260 parts 1,14-Tetradecanediol: 190 parts

Dibutyltin oxide (catalyst): 0.3 parts

These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 3 hours under reduced pressure. The thickened mixture is air-cooled to terminate the reaction. The resulting resin is crystalline polyester resin (B5). Its weight-average molecular weight is 25000, its melting temperature is 112° C., and its solubility parameter (SP) is 8.65.

Example 1

Amorphous polyester resin (A1): 79 parts

Crystalline polyester resin (B1): 11.2 parts

A coloring agent (yellow pigment; Pigment Yellow 74): 6 parts

A release agent (polyethylene wax; Mitsui Chemicals NL100): 5 parts

These materials are mixed together in a Henschel mixer (FM75L, Nippon Coke & Engineering), the resulting mixture is kneaded through a twin-screw extruder (TEM-48SS, Shibaura Machine), and the kneaded mixture is rolled and cooled. The average rate of cooling is set to 10° C./s by adjusting the supply rate the kneaded mixture and the flow rate of cooling water to ensure it will take 10 seconds or less for the surface of the mixture to be cooled to 40° C. The cooled mixture is shredded in a hammer mill, and the resulting grains are stored in a temperature-controlled chamber at 50° C. for 24 hours. The stored grains are pulverized in a jet mill (AFG, Hosokawa Micron), the resulting particles are classified using an elbow-jet classifier (EJ-LABO, Nittetsu Mining), and the classified particles are blown with hot air at 150° C. for 1 hour. The resulting particles are toner particles 1, and their volume-average diameter is 7.4 μm.

Toner particles 1:100 parts

Sol-gel silica particles (number-average diameter=120 nm): 2.0 parts

Strontium titanate particles (number-average diameter=50 nm): 0.2 parts

These materials are mixed together in a Henschel mixer. The product is toner 1.

Example 2

Production of Toner Particles 2-1

Amorphous polyester resin (A1): 79 parts

Crystalline polyester resin (B1): 8 parts

A coloring agent (yellow pigment; Pigment Yellow 74): 6 parts

A release agent (polyethylene wax; Mitsui Chemicals NL100): 5 parts

These materials are mixed together in a Henschel mixer (FM75L, Nippon Coke & Engineering), the resulting mixture is kneaded through a twin-screw extruder (TEM-48SS, Shibaura Machine), and the kneaded mixture is rolled and cooled. The average rate of cooling is set to 10° C./s by adjusting the supply rate the kneaded mixture and the flow rate of cooling water to ensure it will take 10 seconds or less for the surface of the mixture to be cooled to 40° C. The cooled mixture is shredded in a hammer mill, and the resulting grains are stored in a temperature-controlled chamber at 20° C. for 12 hours. The stored grains are pulverized in a jet mill (AFG, Hosokawa Micron), the resulting particles are classified using an elbow-jet classifier (EJ-LABO, Nittetsu Mining), and the classified particles are blown with hot air at 150° C. for 1 hour. The resulting particles are toner particles 2-1, and their volume-average diameter is 7.9 μm.

Production of Toner Particles 2-2

Amorphous polyester resin (A1): 52 parts

Crystalline polyester resin (B1): 30 parts

A coloring agent (yellow pigment; Pigment Yellow 74): 6 parts

A release agent (polyethylene wax; Mitsui Chemicals NL100): 5 parts

These materials are mixed together in a Henschel mixer (FM75L, Nippon Coke & Engineering), the resulting mixture is kneaded through a twin-screw extruder (TEM-48SS, Shibaura Machine), and the kneaded mixture is rolled and cooled. The average rate of cooling is set to 10° C./s by adjusting the supply rate the kneaded mixture and the flow rate of cooling water to ensure it will take 10 seconds or less for the surface of the mixture to be cooled to 40° C. The cooled mixture is shredded in a hammer mill, and the resulting grains are stored in a temperature-controlled chamber at 20° C. for 12 hours. The stored grains are pulverized in a jet mill (AFG, Hosokawa Micron), the resulting particles are classified using an elbow-jet classifier (EJ-LABO, Nittetsu Mining), and the classified particles are blown with hot air at 150° C. for 1 hour. The resulting particles are toner particles 2-2, and their volume-average diameter is 3.5 μm.

Production of Toner 2

Toner particles 2-1: 66 parts

Toner particles 2-2: 34 parts

Sol-gel silica particles (number-average diameter=120 nm): 2.0 parts

Strontium titanate particles (number-average diameter=50 nm): 0.2 parts

These materials are mixed together in a Henschel mixer. The product is toner 2, and its volume-average diameter of particles is 7.4 μm.

Example 3

Toner is obtained in the same way as in Example 1 except that the average rate of cooling of the kneaded mixture is changed to 13° C./s. The resulting toner is toner 3.

Example 4

Toner is obtained in the same way as in Example 1 except that the average rate of cooling of the kneaded mixture is changed to 6° C./s. The resulting toner is toner 4.

Example 5

Toner is obtained in the same way as in Example 1 except that the average rate of cooling of the kneaded mixture is changed to 14° C./s. The resulting toner is toner 5.

Example 6

Toner is obtained in the same way as in Example 1 except that the duration of storage in a temperature-controlled chamber at 50° C. is changed from 24 hours to 48 hours. The resulting toner is toner 6.

Example 7

Toner is obtained in the same way as in Example 1 except that the duration of storage in a temperature-controlled chamber at 50° C. is changed from 24 hours to 36 hours. The resulting toner is toner 7.

Example 8

Toner is obtained in the same way as in Example 1 except that the duration of storage in a temperature-controlled chamber at 50° C. is changed from 24 hours to 30 hours. The resulting toner is toner 8.

Example 9

Toner is obtained in the same way as in Example 1 except that the duration of storage in a temperature-controlled chamber at 50° C. is changed from 24 hours to 12 hours. The resulting toner is toner 9.

Example 10

Toner is obtained in the same way as in Example 1 except that the time it takes the surface of the kneaded mixture to be cooled to 40° C. is changed from 10 seconds or less to 3 seconds or less. The resulting toner is toner 10.

Example 11

Toner is obtained in the same way as in Example 1 except that the time it takes the surface of the kneaded mixture to be cooled to 40° C. is changed from 10 seconds or less to 5 seconds or less. The resulting toner is toner 11.

Example 12

Toner is obtained in the same way as in Example 1 except that the time it takes the surface of the kneaded mixture to be cooled to 40° C. is changed from 10 seconds or less to 20 seconds or less. The resulting toner is toner 12.

Example 13

Toner is obtained in the same way as in Example 1 except that the time it takes the surface of the kneaded mixture to be cooled to 40° C. is changed from 10 seconds or less to 30 seconds or less. The resulting toner is toner 13.

Example 14

Toner is obtained in the same way as in Example 1 except that the duration of hot-air blow is changed from 1 hour to 15 minutes. The resulting toner is toner 14.

Example 15

Toner is obtained in the same way as in Example 1 except that the duration of hot-air blow is changed from 1 hour to 30 minutes. The resulting toner is toner 15.

Example 16

Toner is obtained in the same way as in Example 1 except that the duration of hot-air blow is changed from 1 hour to 2 hours. The resulting toner is toner 16.

Example 17

Toner is obtained in the same way as in Example 1 except that the duration of hot-air blow is changed from 1 hour to 3 hours. The resulting toner is toner 17.

Example 18

Toner is obtained in the same way as in Example 1 except that the amount of crystalline polyester resin (B1) is changed to 3.6 parts. The resulting toner is toner 18.

Example 19

Toner is obtained in the same way as in Example 1 except that the amount of crystalline polyester resin (B1) is changed to 4.2 parts. The resulting toner is toner 19.

Example 20

Toner is obtained in the same way as in Example 1 except that the amount of crystalline polyester resin (B1) is changed to 38.1 parts. The resulting toner is toner 20.

Example 21

Toner is obtained in the same way as in Example 1 except that the amount of crystalline polyester resin (B1) is changed to 40.5 parts. The resulting toner is toner 21.

Example 22

Toner is obtained in the same way as in Example 1 except that crystalline polyester resin (B1) is changed to crystalline polyester resin (B2). The resulting toner is toner 22.

Example 23

Toner is obtained in the same way as in Example 1 except that crystalline polyester resin (B1) is changed to crystalline polyester resin (B3). The resulting toner is toner 23.

Example 24

Toner is obtained in the same way as in Example 1 except that crystalline polyester resin (B1) is changed to crystalline polyester resin (B4). The resulting toner is toner 24.

Example 25

Toner is obtained in the same way as in Example 1 except that crystalline polyester resin (B1) is changed to crystalline polyester resin (B5). The resulting toner is toner 25.

Example 26

Toner is obtained in the same way as in Example 1 except that the toner particles blown with hot air are stored at 40° C. for 24 hours. The resulting toner is toner 26.

Example 27

Toner is obtained in the same way as in Example 1 except that the average rate of cooling of the kneaded mixture is changed to 14° C./s and that the temperature of the 24-hour storage in a temperature-controlled chamber is changed from 50° C. to 54° C. The resulting toner is toner 27.

Example 28

Toner is obtained in the same way as in Example 1 except that the average rate of cooling of the kneaded mixture is changed to 12° C./s and that the temperature of the 24-hour storage in a temperature-controlled chamber is changed from 50° C. to 52° C. The resulting toner is toner 28.

Example 29

Toner is obtained in the same way as in Example 1 except that the average rate of cooling of the kneaded mixture is changed to 8° C./s and that the temperature of the 24-hour storage in a temperature-controlled chamber is changed from 50° C. to 47° C. The resulting toner is toner 29.

Example 30

Toner is obtained in the same way as in Example 1 except that the average rate of cooling of the kneaded mixture is changed to 5° C./s and that the temperature of the 24-hour storage in a temperature-controlled chamber is changed from 50° C. to 45° C. The resulting toner is toner 30.

Example 31

Toner is obtained in the same way as in Example 1 except that the amount of crystalline polyester resin (B1) is changed to 4.1 parts and that the average rate of cooling of the kneaded mixture is changed to 14° C./s. The resulting toner is toner 31.

Example 32

Toner is obtained in the same way as in Example 31 except that the amount of crystalline polyester resin (B1) is changed to 4.4 parts. The resulting toner is toner 32.

Example 33

Toner is obtained in the same way as in Example 31 except that the amount of crystalline polyester resin (B1) is changed to 42.6 parts. The resulting toner is toner 33.

Example 34

Toner is obtained in the same way as in Example 31 except that the amount of crystalline polyester resin (B1) is changed to 44.1 parts. The resulting toner is toner 34.

Example 35

Toner is obtained in the same way as in Example 1 except that amorphous polyester resin (A1) is changed to amorphous polyester resin (A2). The resulting toner is toner 35.

Example 36

Toner is obtained in the same way as in Example 1 except that amorphous polyester resin (A1) is changed to amorphous polyester resin (A3). The resulting toner is toner 36.

Example 37

Toner is obtained in the same way as in Example 1 except that amorphous polyester resin (A1) is changed to amorphous polyester resin (A4). The resulting toner is toner 37.

Example 38

Toner is obtained in the same way as in Example 1 except that amorphous polyester resin (A1) is changed to amorphous polyester resin (A5). The resulting toner is toner 38.

Example 39

Toner is obtained in the same way as in Example 1 except that the coloring agent is changed from Pigment Yellow 74 to Pigment Yellow 155. The resulting toner is toner 39.

Comparative Example 1

Toner is obtained in the same way as in Example 1 except that the average rate of cooling of the kneaded mixture is changed to 4° C./s. The resulting toner is toner C1.

Comparative Example 2

Toner is obtained in the same way as in Example 1 except that the average rate of cooling of the kneaded mixture is changed to 18° C./s. The resulting toner is toner C2.

Testing

Characterization

The following characteristics of the toners of Examples and Comparative Examples are measured as described above.

Total areas Qf1 and Qf2 of all endothermic peaks detected during the first and second temperature rises, respectively, when the full-range toner particles are analyzed by differential scanning calorimetry after one-day storage under 50° C. conditions Total areas Qs1 and Qs2 of all endothermic peaks detected during the first and second temperature rises, respectively, when the classified toner particles are analyzed by differential scanning calorimetry after one-day storage under 50° C. conditions Relative area Sf of crystalline-resin domains to the particle cross-sectional area in the full-range toner particles ("Relative area Sf" in the tables)

Relative area Ss of crystalline-resin domains to the particle cross-sectional area in the classified toner particles ("Relative area Ss" in the tables) Weatherability Developers for the image forming apparatus below are prepared with the toners of Examples and Comparative Examples.

With each of the developers, a 4 cm×4 cm solid image is printed on a sheet of A4 paper under 8° C. conditions using a developing device of Fuji Xerox's ApeosPort Print C4570 image forming apparatus. The amount of toner is set to 5.0 g/m$^2$.

The resulting image is bent once, and then exposed to light from a xenon lamp using Suntest CPS+ (Toyo Seiki Seisaku-sho).

Before and after the exposure, the color of the image is measured using X-Rite 962 spectrocolorimeter (Videojet X-Rite).

Specifically, the color difference ΔE between before and after the exposure is calculated from measured L*, a*, and b*, and weatherability is graded according to the criteria below:

$$\Delta E=\sqrt{\{(L_1-L_2)^2+(a_1-a_2)^2+(b_1-b_2)\}}$$

where $L_1$, $a_1$, and $b_1$ are the L*, a*, and b*, respectively, of the image before the exposure to light, and $L_2$, $a_2$, and $b_2$ are those after the exposure to light.

A: ΔE is 0.19 or less

B: ΔE is more than 0.20 and 0.29 or less

C: ΔE is more than 0.30 and 0.39 or less

D: ΔE is more than 0.40 and 0.49 or less

E: ΔE is more than 0.50

The results are presented in Tables 1-1-1 to 1-3.

AmoSP: Solubility parameter (SP) of the amorphous resin

CrySP: Solubility parameter (SP) of the crystalline resin

Cry-MT: Melting temperature of the crystalline resin

Y74: Pigment Yellow 74 (insoluble monoazo pigment)

TABLE 1-1-1

| | Toner particles | | | | | | |
|---|---|---|---|---|---|---|---|
| | Particle | Amorphous resin | | Crystalline resin | | | |
| | diameter D50v μm | AmoSP | Amorphous polyester resin | CrySP | Cry-MT ° C. | Content Wf % by mass | Relative area Sf % |
| Example 1 | 7.4 | 9.91 | A1 | 9.13 | 73 | 11.2 | 10.5 |
| Example 2 | 6.3 | 9.91 | A1 | 9.13 | 73 | 11.4 | 10.4 |
| Example 3 | 7.9 | 9.91 | A1 | 9.13 | 73 | 11.2 | 11.2 |
| Example 4 | 7.5 | 9.91 | A1 | 9.13 | 73 | 11.2 | 11.7 |
| Example 5 | 6.5 | 9.91 | A1 | 9.13 | 73 | 11.2 | 11 |
| Example 6 | 6.0 | 9.91 | A1 | 9.13 | 73 | 11.2 | 13.1 |
| Example 7 | 7.4 | 9.91 | A1 | 9.13 | 73 | 11.2 | 10.9 |
| Example 8 | 6.9 | 9.91 | A1 | 9.13 | 73 | 11.2 | 12.5 |
| Example 9 | 6.9 | 9.91 | A1 | 9.13 | 73 | 11.2 | 13 |
| Example 10 | 8.8 | 9.91 | A1 | 9.13 | 73 | 11.2 | 12.9 |
| Example 11 | 6.8 | 9.91 | A1 | 9.13 | 73 | 11.2 | 14.5 |
| Example 12 | 8.3 | 9.91 | A1 | 9.13 | 73 | 11.2 | 11 |
| Example 13 | 4.9 | 9.91 | A1 | 9.13 | 73 | 11.2 | 12.5 |
| Example 14 | 7.6 | 9.91 | A1 | 9.13 | 73 | 11.2 | 11.9 |
| Example 15 | 8.6 | 9.91 | A1 | 9.13 | 73 | 11.2 | 12.9 |
| Example 16 | 8.3 | 9.91 | A1 | 9.13 | 73 | 11.2 | 13.9 |
| Example 17 | 6.3 | 9.91 | A1 | 9.13 | 73 | 11.2 | 12.1 |
| Example 18 | 7.1 | 9.91 | A1 | 9.13 | 73 | 3.6 | 3.1 |
| Example 19 | 8.1 | 9.91 | A1 | 9.13 | 73 | 4.2 | 4.5 |
| Example 20 | 7.6 | 9.91 | A1 | 9.13 | 73 | 38.1 | 38.2 |
| Example 21 | 8.5 | 9.91 | A1 | 9.13 | 73 | 40.5 | 40.8 |
| Example 22 | 8.1 | 9.91 | A1 | 9.63 | 59 | 11.2 | 13.1 |
| Example 23 | 8.3 | 9.91 | A1 | 9.21 | 61 | 11.2 | 12.2 |
| Example 24 | 7.3 | 9.91 | A1 | 8.93 | 109 | 11.2 | 13.9 |
| Example 25 | 7.1 | 9.91 | A1 | 8.65 | 112 | 11.2 | 12.9 |
| Example 26 | 7.6 | 9.91 | A1 | 9.13 | 73 | 11.2 | 10.5 |
| Example 27 | 8.3 | 9.91 | A1 | 9.13 | 73 | 11.2 | 12.1 |
| Example 28 | 8.1 | 9.91 | A1 | 9.13 | 73 | 11.2 | 11.9 |
| Example 29 | 9.3 | 9.91 | A1 | 9.13 | 73 | 11.2 | 11.3 |
| Example 30 | 8.0 | 9.91 | A1 | 9.13 | 73 | 11.2 | 12 |
| Example 31 | 9.1 | 9.91 | A1 | 9.13 | 73 | 4.1 | 3.4 |
| Example 32 | 7.4 | 9.91 | A1 | 9.13 | 73 | 4.4 | 4.1 |
| Example 33 | 7.8 | 9.91 | A1 | 9.13 | 73 | 42.6 | 43.9 |
| Example 34 | 8.7 | 9.91 | A1 | 9.13 | 73 | 44.1 | 44.1 |
| Example 35 | 7.2 | 9.28 | A2 | 9.13 | 73 | 11.2 | 12.7 |
| Example 36 | 7.5 | 9.34 | A3 | 9.13 | 73 | 11.2 | 12.5 |
| Example 37 | 8.7 | 10.1 | A4 | 9.13 | 73 | 11.2 | 12.6 |

TABLE 1-1-1-continued

| | Toner particles | | | | | | |
|---|---|---|---|---|---|---|---|
| | Particle | Amorphous resin | | Crystalline resin | | | |
| | diameter D50v µm | AmoSP | Amorphous polyester resin | CrySP | Cry-MT ° C. | Content Wf % by mass | Relative area Sf % |
| Example 38 | 7.4 | 10.19 | A5 | 9.13 | 73 | 11.2 | 12.7 |
| Example 39 | 7.8 | 9.91 | A1 | 9.13 | 73 | 11.2 | 12.5 |
| Comparative Example 1 | 6.9 | 9.91 | A1 | 9.13 | 73 | 11.2 | 12.4 |
| Comparative Example 2 | 8.0 | 9.91 | A1 | 9.13 | 73 | 11.2 | 12.8 |

TABLE 1-1-2

| | Toner particles | | | |
|---|---|---|---|---|
| | | | Total areas of endothermic peaks | |
| | AmoSP-CrySP | Coloring agent | Qf1 | Qf2 |
| Example 1 | 0.78 | Y74 | 20.1 | 13.1 |
| Example 2 | 0.78 | Y74 | 20.7 | 12.0 |
| Example 3 | 0.78 | Y74 | 20.8 | 13.4 |
| Example 4 | 0.78 | Y74 | 21.3 | 11.5 |
| Example 5 | 0.78 | Y74 | 20.6 | 13.4 |
| Example 6 | 0.78 | Y74 | 24.1 | 1.5 |
| Example 7 | 0.78 | Y74 | 21.1 | 2.6 |
| Example 8 | 0.78 | Y74 | 25.8 | 19.9 |
| Example 9 | 0.78 | Y74 | 25 | 22.0 |
| Example 10 | 0.78 | Y74 | 25.7 | 17.5 |
| Example 11 | 0.78 | Y74 | 29.1 | 17.2 |
| Example 12 | 0.78 | Y74 | 20.6 | 11.0 |
| Example 13 | 0.78 | Y74 | 24.7 | 15.6 |
| Example 14 | 0.78 | Y74 | 23.4 | 13.0 |
| Example 15 | 0.78 | Y74 | 23.8 | 14.0 |
| Example 16 | 0.78 | Y74 | 24.7 | 13.9 |
| Example 17 | 0.78 | Y74 | 22.1 | 13.9 |
| Example 18 | 0.78 | Y74 | 9 | 5.4 |
| Example 19 | 0.78 | Y74 | 9.6 | 5.9 |
| Example 20 | 0.78 | Y74 | 76.6 | 50.6 |
| Example 21 | 0.78 | Y74 | 83.5 | 47.5 |
| Example 22 | 0.28 | Y74 | 25 | 19.0 |
| Example 23 | 0.7 | Y74 | 24.1 | 12.4 |
| Example 24 | 0.98 | Y74 | 26.2 | 16.0 |
| Example 25 | 1.26 | Y74 | 24 | 11.8 |
| Example 26 | 0.78 | Y74 | 20.1 | 13.1 |
| Example 27 | 0.78 | Y74 | 21.9 | 13.0 |
| Example 28 | 0.78 | Y74 | 22.1 | 11.1 |
| Example 29 | 0.78 | Y74 | 21.1 | 11.2 |
| Example 30 | 0.78 | Y74 | 20.5 | 12.1 |
| Example 31 | 0.78 | Y74 | 7.1 | 3.8 |
| Example 32 | 0.78 | Y74 | 7.9 | 4.4 |
| Example 33 | 0.78 | Y74 | 77.1 | 41.7 |
| Example 34 | 0.78 | Y74 | 84.1 | 48.1 |
| Example 35 | 0.15 | Y74 | 25.1 | 15.6 |
| Example 36 | 0.21 | Y74 | 24.1 | 13.5 |
| Example 37 | 0.97 | Y74 | 21.3 | 12.6 |
| Example 38 | 1.06 | Y74 | 24.8 | 14.1 |
| Example 39 | 0.78 | PY155 | 24.6 | 14.0 |
| Comparative Example 1 | 0.78 | Y74 | 25.1 | 15.3 |
| Comparative Example 2 | 0.78 | Y74 | 24.9 | 15.6 |

TABLE 1-2

| | Classified toner particles | | | | | |
|---|---|---|---|---|---|---|
| | Crystalline resin | | | | | |
| | Content Ws | Relative area Ss | Total areas of endothermic peaks | | Qs1/ | Qf2/ |
| | % by mass | % | Qs1 | Qs2 | Qf1 | Qf1 |
| Example 1 | 12.4 | 11.9 | 31.0 | 12.9 | 1.54 | 0.651 |
| Example 2 | 12.8 | 12.3 | 35.4 | 10.2 | 1.71 | 0.582 |
| Example 3 | 12.7 | 13.3 | 27.9 | 8.9 | 1.34 | 0.642 |
| Example 4 | 11.8 | 13.0 | 24.7 | 2.9 | 1.16 | 0.538 |
| Example 5 | 13.1 | 14.1 | 40.0 | 14.5 | 1.94 | 0.651 |
| Example 6 | 14.8 | 16.5 | 26.5 | 1.3 | 1.10 | 0.061 |
| Example 7 | 11.3 | 13.3 | 23.4 | 1.0 | 1.11 | 0.122 |
| Example 8 | 12.5 | 14.0 | 28.4 | 7.1 | 1.1 | 0.771 |
| Example 9 | 12.7 | 15.1 | 27.8 | 11.4 | 1.11 | 0.879 |
| Example 10 | 12.6 | 15.2 | 28.8 | 19.4 | 1.12 | 0.68 |
| Example 11 | 12.4 | 17.2 | 32.0 | 18.5 | 1.1 | 0.591 |
| Example 12 | 12.6 | 12.4 | 23.3 | 1.4 | 1.13 | 0.532 |
| Example 13 | 12.7 | 14.1 | 27.2 | 3.3 | 1.1 | 0.631 |
| Example 14 | 11.5 | 15.3 | 26.0 | 12.1 | 1.11 | 0.556 |
| Example 15 | 12.0 | 14.4 | 26.2 | 8.4 | 1.1 | 0.588 |
| Example 16 | 13.2 | 16.4 | 29.4 | 3.9 | 1.19 | 0.561 |
| Example 17 | 13.9 | 15.1 | 27.4 | 14.8 | 1.24 | 0.631 |
| Example 18 | 3.8 | 4.3 | 10.2 | 4.7 | 1.13 | 0.599 |
| Example 19 | 4.4 | 5.1 | 10.8 | 5.9 | 1.13 | 0.612 |
| Example 20 | 40.1 | 42 | 84.3 | 24.4 | 1.1 | 0.661 |
| Example 21 | 42.7 | 44.8 | 91.9 | 34.9 | 1.1 | 0.569 |
| Example 22 | 13.6 | 16.3 | 28.0 | 11.0 | 1.12 | 0.76 |
| Example 23 | 12.7 | 13.8 | 26.8 | 7.7 | 1.11 | 0.515 |
| Example 24 | 14.7 | 15.7 | 29.1 | 14.7 | 1.11 | 0.611 |
| Example 25 | 12.7 | 14.7 | 26.9 | 3.9 | 1.12 | 0.491 |
| Example 26 | 12.4 | 11.9 | 22.3 | 6.1 | 1.11 | 0.676 |
| Example 27 | 12.6 | 12.9 | 24.3 | 6.5 | 1.11 | 0.593 |
| Example 28 | 11.9 | 13.6 | 24.8 | 2.9 | 1.12 | 0.5 |
| Example 29 | 11.8 | 14.4 | 24.3 | 7.9 | 1.15 | 0.531 |
| Example 30 | 12.4 | 16.1 | 23.0 | 3.0 | 1.12 | 0.59 |
| Example 31 | 4.2 | 3.8 | 8.2 | 1.5 | 1.15 | 0.531 |
| Example 32 | 4.6 | 4.6 | 8.8 | 1.6 | 1.11 | 0.551 |
| Example 33 | 44 | 44.6 | 88.7 | 14.5 | 1.15 | 0.541 |
| Example 34 | 45.1 | 45.2 | 94.2 | 21.3 | 1.12 | 0.572 |
| Example 35 | 12.7 | 14.7 | 27.6 | 7.0 | 1.1 | 0.622 |
| Example 36 | 12.4 | 14.4 | 27.0 | 8.9 | 1.12 | 0.559 |
| Example 37 | 12.9 | 14.2 | 23.6 | 7.7 | 1.11 | 0.591 |
| Example 38 | 12.7 | 16.0 | 27.5 | 6.4 | 1.11 | 0.57 |
| Example 39 | 13.4 | 15.1 | 28.0 | 11.9 | 1.14 | 0.571 |
| Comparative Example 1 | 10.5 | 14.5 | 26.9 | 14.4 | 1.07 | 0.611 |
| Comparative Example 2 | 13.9 | 16.5 | 52.3 | 13.4 | 2.10 | 0.627 |

TABLE 1-3

| | Qs2/Qs1 | Qf2/Qf1-Qs2/Qs1 | Ws/Wf | Ss/Sf | Weatherability | |
|---|---|---|---|---|---|---|
| Example 1 | 0.416 | 0.235 | 1.11 | 1.13 | A | 0.15 |
| Example 2 | 0.288 | 0.294 | 1.12 | 1.18 | A | 0.17 |
| Example 3 | 0.319 | 0.323 | 1.13 | 1.19 | A | 0.18 |
| Example 4 | 0.119 | 0.419 | 1.05 | 1.11 | C | 0.34 |
| Example 5 | 0.364 | 0.287 | 1.17 | 1.28 | C | 0.31 |
| Example 6 | 0.049 | 0.012 | 1.32 | 1.26 | D | 0.42 |
| Example 7 | 0.041 | 0.081 | 1.01 | 1.22 | B | 0.28 |
| Example 8 | 0.250 | 0.521 | 1.12 | 1.12 | B | 0.27 |
| Example 9 | 0.412 | 0.467 | 1.13 | 1.16 | D | 0.41 |
| Example 10 | 0.673 | 0.007 | 1.13 | 1.18 | D | 0.4 |
| Example 11 | 0.579 | 0.012 | 1.11 | 1.18 | C | 0.35 |
| Example 12 | 0.062 | 0.47 | 1.13 | 1.13 | C | 0.3 |
| Example 13 | 0.121 | 0.51 | 1.13 | 1.13 | D | 0.39 |
| Example 14 | 0.464 | 0.092 | 1.03 | 1.29 | D | 0.44 |
| Example 15 | 0.321 | 0.267 | 1.07 | 1.11 | C | 0.37 |
| Example 16 | 0.133 | 0.428 | 1.18 | 1.18 | C | 0.32 |
| Example 17 | 0.541 | 0.090 | 1.24 | 1.25 | D | 0.41 |
| Example 18 | 0.461 | 0.138 | 1.09 | 1.39 | D | 0.46 |
| Example 19 | 0.548 | 0.064 | 1.05 | 1.13 | C | 0.38 |
| Example 20 | 0.290 | 0.371 | 1.07 | 1.10 | C | 0.32 |
| Example 21 | 0.380 | 0.189 | 1.15 | 1.10 | D | 0.41 |
| Example 22 | 0.393 | 0.367 | 1.17 | 1.25 | D | 0.4 |
| Example 23 | 0.286 | 0.229 | 1.09 | 1.13 | C | 0.37 |
| Example 24 | 0.505 | 0.106 | 1.11 | 1.13 | C | 0.36 |
| Example 25 | 0.146 | 0.345 | 1.13 | 1.14 | D | 0.46 |
| Example 26 | 0.273 | 0.403 | 1.07 | 0.98 | D | 0.41 |
| Example 27 | 0.269 | 0.324 | 1.14 | 1.07 | D | 0.42 |
| Example 28 | 0.118 | 0.382 | 1.14 | 1.14 | C | 0.37 |
| Example 29 | 0.325 | 0.206 | 1.16 | 1.27 | C | 0.34 |
| Example 30 | 0.132 | 0.458 | 1.11 | 1.34 | D | 0.46 |
| Example 31 | 0.187 | 0.344 | 1.02 | 1.12 | D | 0.42 |
| Example 32 | 0.180 | 0.371 | 1.14 | 1.12 | C | 0.33 |
| Example 33 | 0.164 | 0.377 | 1.03 | 1.02 | C | 0.39 |
| Example 34 | 0.226 | 0.346 | 1.12 | 1.02 | D | 0.41 |
| Example 35 | 0.255 | 0.367 | 1.13 | 1.16 | D | 0.42 |
| Example 36 | 0.328 | 0.231 | 1.11 | 1.15 | C | 0.38 |
| Example 37 | 0.326 | 0.265 | 1.15 | 1.13 | C | 0.37 |
| Example 38 | 0.234 | 0.336 | 1.13 | 1.26 | D | 0.44 |
| Example 39 | 0.425 | 0.146 | 1.20 | 1.20 | B | 0.25 |
| Comparative Example 1 | 0.538 | 0.073 | 0.94 | 1.17 | E | 0.53 |
| Comparative Example 2 | 0.256 | 0.371 | 1.24 | 1.29 | E | 0.56 |

As can be seen from these data, the toners of Examples give highly weatherable images compared with those of Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A toner for developing an electrostatic charge image, the toner comprising:

toner particles that contain an amorphous polyester resin and a crystalline polyester resin, wherein:

a ratio Qs1/Qf1 is 1.1 or more and 2.0 or less, where Qf1 is a total area of all endothermic peaks detected during a first temperature rise when the toner particles are analyzed by differential scanning calorimetry after one-day storage under 50° C. conditions; and Qs1 is a total area of all endothermic peaks detected during a first temperature rise when classified toner particles are analyzed by differential scanning calorimetry after one-day storage under 50° C. conditions, the classified toner particles being a fraction of the toner particles in which toner particles having a diameter equal to or larger than a volume-average diameter D50v of the toner particles constitute 10% by number or less.

2. The toner according to claim 1 for developing an electrostatic charge image, wherein:

a ratio Qf2/Qf1 is 0.1 or more and 0.8 or less, where Qf1 and Qf2 are total areas of all endothermic peaks detected during first and second temperature rises, respectively, when the toner particles are analyzed by differential scanning calorimetry after one-day storage under 50° C. conditions.

3. The toner according to claim 1 for developing an electrostatic charge image, wherein:

a difference Qf2/Qf1-Qs2/Qs1 between ratios Qf2/Qf1 and Qs2/Qs1 is 0.01 or more and 0.5 or less, where Qf1 and Qf2 are total areas of all endothermic peaks detected during first and second temperature rises, respectively, when the toner particles conducted are analyzed by differential scanning calorimetry after one-day storage under 50° C. conditions; and Qs1 and Qs2 are total areas of all endothermic peaks detected during first and second temperature rises, respectively, when the classified toner particles are analyzed by differential scanning calorimetry after one-day storage under 50° C. conditions.

4. A toner for developing an electrostatic charge image, the toner comprising:

toner particles that contain an amorphous polyester resin and a crystalline polyester resin, wherein:

a ratio Ws/Wf is 1.05 or more and 1.20 or less, where Wf is a crystalline resin content of the toner particles, and Ws is a crystalline resin content of classified toner particles, the classified toner particles being a fraction of the toner particles in which toner particles having a diameter equal to or larger than a volume-average diameter D50v of the toner particles constitute 10% by number or less.

5. The toner according to claim 4 for developing an electrostatic charge image, wherein the crystalline polyester resin content Ws of the classified toner particles is 4.5% by mass or more and 50% by mass or less.

6. The toner according to claim 1 for developing an electrostatic charge image, wherein the crystalline polyester resin has a melting temperature of 60° C. or higher and 110° C. or lower.

7. The toner according to claim 4 for developing an electrostatic charge image, wherein the crystalline polyester resin has a melting temperature of 60° C. or higher and 110° C. or lower.

8. The toner according to claim 1 for developing an electrostatic charge image, wherein in a cross-sectional observation of the toner particles and the classified toner particles, Ss is larger than Sf, where Ss is a relative area of crystalline-resin domains to a particle cross-sectional area in the classified toner particles, and Sf is a relative area of crystalline-resin domains to a particle cross-sectional area in the toner particles.

9. The toner according to claim 4 for developing an electrostatic charge image, wherein in a cross-sectional observation of the toner particles and the classified toner particles, Ss is larger than Sf, where Ss is a relative area of crystalline-resin domains to a particle cross-sectional area in the classified toner particles, and Sf is a relative area of crystalline-resin domains to a particle cross-sectional area in the toner particles.

10. The toner according to claim 8 for developing an electrostatic charge image, wherein the relative areas Sf and Ss of crystalline-resin domains to particle cross-sectional areas in the toner particles and the classified toner particles, respectively, are such that $1.10 \leq Ss/Sf \leq 1.30$.

11. The toner according to claim 9 for developing an electrostatic charge image, wherein the relative areas Sf and Ss of crystalline-resin domains to particle cross-sectional areas in the toner particles and the classified toner particles, respectively, are such that $1.10 \leq Ss/Sf \leq 1.30$.

12. The toner according to claim 8 for developing an electrostatic charge image, wherein the relative area Ss of crystalline-resin domains to a particle cross-sectional area in the classified toner particles is 4.0% or more and 45.0% or less.

13. The toner according to claim 9 for developing an electrostatic charge image, wherein the relative area Ss of crystalline-resin domains to a particle cross-sectional area in the classified toner particles is 4.0% or more and 45.0% or less.

14. The toner according to claim 1 for developing an electrostatic charge image, wherein there is an absolute difference of 0.2 or more and 1.0 or less between a solubility parameter of the amorphous polyester resin and a solubility parameter of the crystalline polyester resin.

15. The toner according to claim 4 for developing an electrostatic charge image, wherein there is an absolute difference of 0.2 or more and 1.0 or less between a solubility parameter of the amorphous polyester resin and a solubility parameter of the crystalline polyester resin.

16. The toner according to claim 1 for developing an electrostatic charge image, wherein the toner particles contain, as a coloring agent or agents, at least one of an insoluble monoazo pigment or an insoluble disazo pigment.

17. The toner according to claim 4 for developing an electrostatic charge image, wherein the toner particles contain, as a coloring agent or agents, at least one of an insoluble monoazo pigment or an insoluble disazo pigment.

18. An electrostatic charge image developer comprising the toner according to claim 1 for developing an electrostatic charge image.

* * * * *